(12) United States Patent
Kobayashi et al.

(10) Patent No.: US 7,035,760 B2
(45) Date of Patent: Apr. 25, 2006

(54) INFORMATION PROCESSING METHOD AND INFORMATION PROCESSING APPARATUS

(75) Inventors: Toshihiro Kobayashi, Kanagawa (JP); Kiyohide Satoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 10/670,285

(22) Filed: Sep. 26, 2003

(65) Prior Publication Data
US 2004/0133379 A1 Jul. 8, 2004

(30) Foreign Application Priority Data
Sep. 27, 2002 (JP) ............................. 2002-284243
Sep. 24, 2003 (JP) ............................. 2003-332395

(51) Int. Cl.
*G01C 17/00* (2006.01)
*E05B 45/06* (2006.01)

(52) U.S. Cl. ........................ 702/150; 702/153; 340/542

(58) Field of Classification Search ................ 702/153, 702/150; 340/542
See application file for complete search history.

(56) References Cited

U.S. PATENT DOCUMENTS

| 6,859,139 B1 | 2/2005 | Sato |
| 2002/0095265 A1 | 7/2002 | Satoh et al. .................. 702/94 |
| 2003/0144813 A1 | 7/2003 | Takemoto et al. .......... 702/153 |

FOREIGN PATENT DOCUMENTS

JP 2002-229730 8/2002

OTHER PUBLICATIONS

Andrei State et al., "Superior Augmented Reality Registration by Integrating Landmark Tracking and Magnetic Tracking", http://www.cs.unc.edu/ 'us/hybrid.html.*

* cited by examiner

*Primary Examiner*—Bryan Bui
*Assistant Examiner*—Meagan S Walling
(74) *Attorney, Agent, or Firm*—Fitzpatrick, Cella, Harper & Scinto

(57) ABSTRACT

There is disclosed an information processing apparatus which easily acquires calibration information required to transform the measured value of a position and orientation sensor into the position and orientation of an image sensing device on a world coordinate system, without using any special calibration tool. When a position and orientation of the image sensing device by attaching a receiver of a position and orientation sensor which comprises a transmitter and a receiver, approximate calibration information required for a coordinate transformation that transforms the position and orientation of the receiver into those of the image sensing device will be calculated by the following steps. Adjusting the position and orientation of the image sensing device so as to the transmitter of the sensor to be sensed at or near the center of a sensed image, obtaining a measured value of the sensor and calculating the approximate coordinate value based on the measured value storing unit

3 Claims, 19 Drawing Sheets

F I G. 13
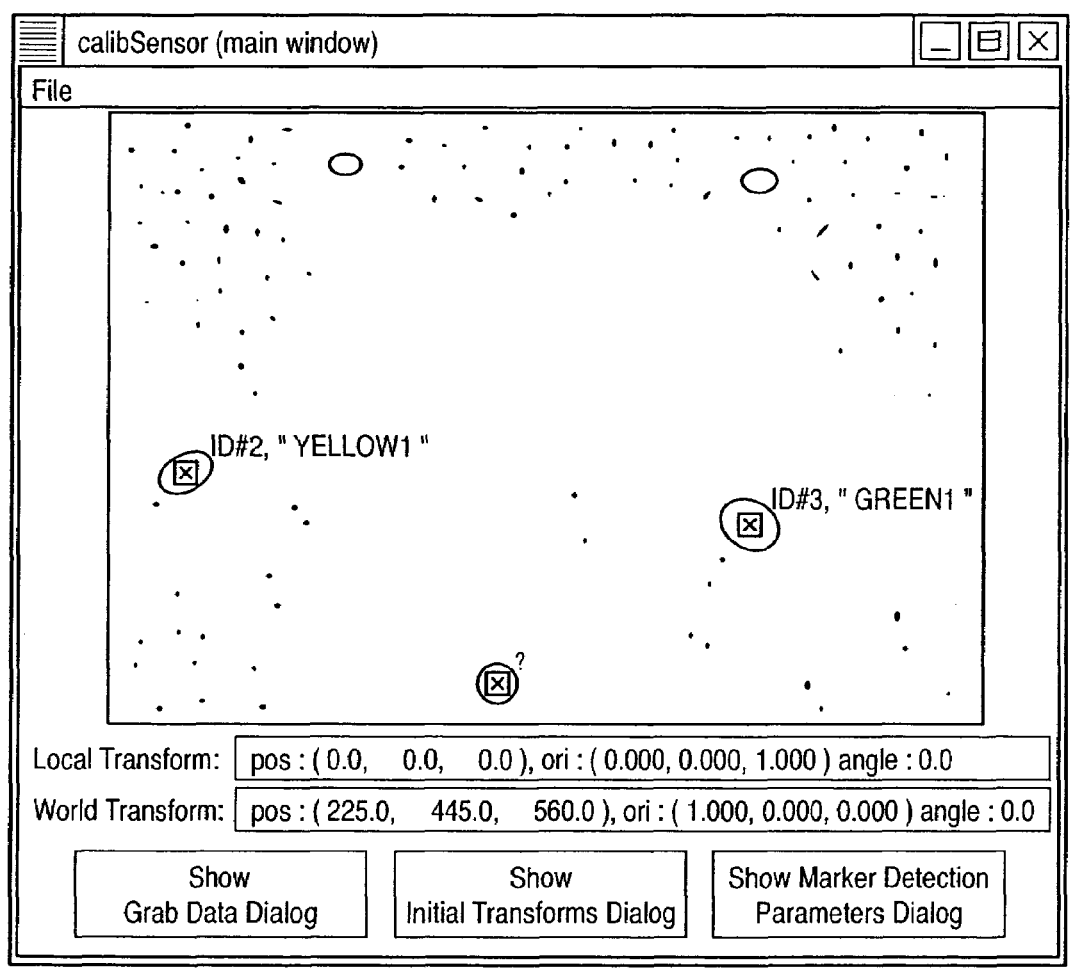

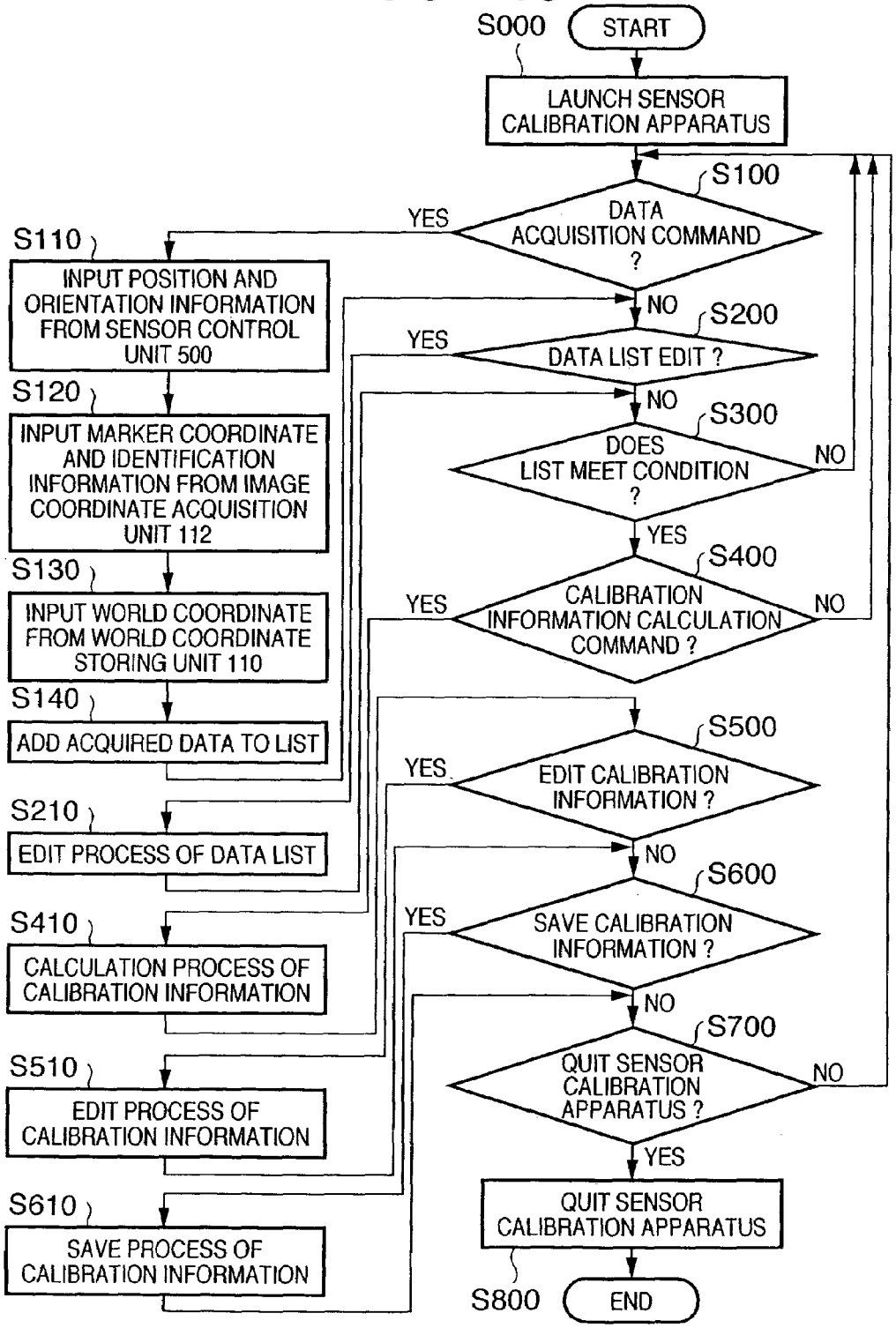

INFORMATION PROCESSING METHOD AND INFORMATION PROCESSING APPARATUS

FIELD OF THE INVENTION

The present invention relates to an information processing method and information processing apparatus, which calculate parameters used upon transforming an output value of a position and orientation sensor.

BACKGROUND OF THE INVENTION

In recent years, studies about mixed reality that aims at seamless joint of real and virtual spaces have been extensively made. An image display apparatus which presents mixed reality is implemented by superimposing an image of a virtual space (e.g., a virtual object, text information, and the like rendered by computer graphics) onto an image of a real space captured by an image sensing device such as a video camera or the like.

As applications of such image display apparatus, new fields different from conventional virtual reality such as operation assistance that superimposes the state in a body onto the body surface of a patient, a mixed reality game in which a player fights against virtual enemies that fly in the real space, and the like are expected.

A common requirement for these applications involves the accuracy of registration between the real and virtual spaces, and many efforts have been conventionally made in this respect.

A problem of registration in mixed reality amounts to obtaining the three-dimensional (3D) position and orientation of an image sensing device on a world coordinate system set on the real space (to be simply referred to as a world coordinate system hereinafter). As a method of solving these problems, it is a common practice to use a 3D position and orientation sensor such as a magnetic sensor, ultrasonic wave sensor, and the like.

In general, the output value of a 3D position and orientation sensor indicates the position and orientation of a measurement point on a sensor coordinate system which is uniquely defined by the sensor, but is not that of the image sensing device on the world coordinate system. Taking the Polhemus FASTRAK (magnetic sensor) which comprises a transmitter and receiver as an example, the position and orientation of the receiver on a coordinate system defined by the transmitter are obtained as the sensor output. Therefore, the sensor output value cannot be directly used as the position and orientation of the image sensing device on the world coordinate system, and must undergo some calibration processes. More specifically, coordinate transformation that transforms the position and orientation of a measurement point into those of the image sensing device, and coordinate transformation that transforms the position and orientation on the sensor coordinate system into those on the world coordinate system are required. In this specification, information used to transform the output value of the sensor for measuring the position and orientation of the image sensing device into the position and orientation of the image sensing device on the world coordinate system will be referred to as calibration information. Further, calibration information required for a coordinate transformation that transforms the position and orientation on the sensor coordinate system into those on the world coordinate system will be referred to as World Transform, and calibration information required for a coordinate transformation that transforms the position and orientation of a measurement point into those of the image sensing device will be referred to as Local Transform.

In order to attain accurate registration between the real and virtual spaces, accurate calibration information must be set by some means. A virtual image which is accurately registered to the real space can be displayed only when the accurate calibration information is given.

Note that the storing form of the calibration information is not particularly limited as long as the information can define the position and orientation of one coordinate system viewed from the other coordinate system. For example, a 4×4 viewing transformation matrix that represents transformation from one coordinate system to the other coordinate system may be used. The position and orientation may be expressed by a total of six parameters, i.e., three parameters that describe the position, and three parameters which express the orientation using an Euler angle. Also, the orientation may be expressed by four parameters, i.e., a three-valued vector that defines the rotation axis, and a rotation angle about that axis, or may be expressed by three parameters that express the rotation angle by the magnitude of the vector which defines the rotation axis.

Furthermore, the position and orientation may be expressed by parameters which represent their inverse transformations (e.g., the position and orientation of the world coordinate system on the sensor coordinate system).

In any of these cases, the position and orientation of an object on a 3D space have only six degrees of freedom (three degrees of freedom for the position, and three degrees of freedom for the orientation). Hence, unknown parameters required for calibration in this image display apparatus are a total of 12 parameters, i.e., six parameters required for transformation from the sensor coordinate system to the world coordinate system, and six parameters required for transformation from the position and orientation of the measurement point to those of the image sensing device.

As one of known methods for setting the calibration information, the user or operator interactively changes the 12 parameters (or 12 or more equivalent parameters) via some input means, and makes adjustment by trial and error until accurate registration is achieved.

Also, according to a calibration method proposed by Japanese Patent Laid-Open No. 2002-229730 (JP-A-2002-229730), if either the Local or World Transform values are obtained by some method, the remaining unknown parameters can be easily derived using a virtual image generated based on position and orientation information fixed to a given value as a visual queue.

However, the aforementioned conventional method requires complicated adjustment and long adjustment time.

SUMMARY OF THE INVENTION

The present invention has been made in consideration of the aforementioned problems, and has as its principal object to allow the user to easily adjust calibration information.

According to an aspect of the present invention, an information processing method for calculating a first parameter used to transform a measured value of a sensor into a position and orientation of an image sensing unit, comprising: acquiring the measured value of the sensor upon adjusting the position and orientation of the image sensing unit to capture an image of a transmitter of the sensor in a real space; and calculating the first parameter using the measured value of the sensor.

According to another aspect of the present invention, a program for making a computer implement an information processing method for calculating a first parameter used to transform a measured value of a sensor into a position and orientation of an image sensing unit, comprising: a program of a step of acquiring the measured value of the sensor upon adjusting the position and orientation of the image sensing unit to capture an image of a transmitter of the sensor in a real space; and a program of a step of calculating the first parameter using the measured value of the sensor.

According to further aspect of the present invention, an information processing apparatus for calculating a first parameter used to transform a measured value of a sensor into a position and orientation of an image sensing unit, comprising: unit adapted to acquire the measured value of the sensor upon adjusting the position and orientation of the image sensing unit to capture an image of a transmitter of the sensor in a real space; and unit adapted to calculated the first parameter using the measured value of the sensor.

According to yet another aspect of the present invention, a computer program product comprising a computer-readable medium having computer code for making a computer implement an information processing method for calculating a first parameter used to transform a measured value of a sensor into a position and orientation of an image sensing unit, the product comprising: process procedure code for acquiring the measured value of the sensor upon adjusting the position and orientation of the image sensing unit to capture an image of a transmitter of the sensor in a real space; and process procedure code for calculating the first parameter using the measured value of the sensor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a view for explaining a state wherein a color extraction result image is displayed on an image display area of the GUI shown in FIG. 3 in the calibration apparatus according to the first embodiment;

FIG. 15 is a flow chart showing the processing sequence of a sensor calibration apparatus according to the first embodiment;

DETAILED DESCRIPTION OF THE PREFERRED EMBODIMENTS

Preferred embodiments of the present invention will now be described in detail in accordance with the accompanying drawings.

First Embodiment

A sensor calibration apparatus as an embodiment of an information processing apparatus according to the present invention calculates calibration information required to transform the position and orientation of a measurement point on the world coordinate system measured by a sensor into those of an image sensing unit on the world coordinate system.

For this purpose, the sensor calibration apparatus of this embodiment calculates calibration information using:

(1) the world coordinate positions of three or more points of markers which are not located on an identical line;

(2) the image coordinate positions of markers on images captured at a plurality of positions/orientations;

(3) sensor measurement values upon capturing the images of (2); and (4) initial values (approximate values) of sensor layout information.

Of these data, (1) the world coordinate positions of the markers are data which must be prepared as known information in a preparation process of calibration. At least three points of markers (landmarks, feature points), whose world coordinate positions are known, must be laid out on a real space. Assume that the markers have, e.g., different colors, so that the image coordinate positions of their images projected onto a captured image can be detected, and these markers can be identified from each other. The world coordinate system has a predetermined point as an origin, and specifies X-, Y-, and Z-axes in orthogonal directions from this origin. Also, assume that the coordinate positions of the three points of markers are known on this coordinate system. That is, the distances to the three points of markers in the X-, Y-, and Z-directions are measured in advance.

Data (2) and (3) are acquired upon calibration. The initial values of the sensor layout information (4) are not always required, but an appropriate solution cannot often be obtained if they are not set.

A theoretical value of the image coordinate position of each marker is calculated on the basis of the world coordinate position of that marker, sensor measurement value, and sensor layout information using these data as inputs, and calibration information (parameters) that can minimize the sum of errors from actually measured values is calculated using the method of least squares.

Note that parameters may be calculated using other methods that use other kinds of information.

Figure 1:
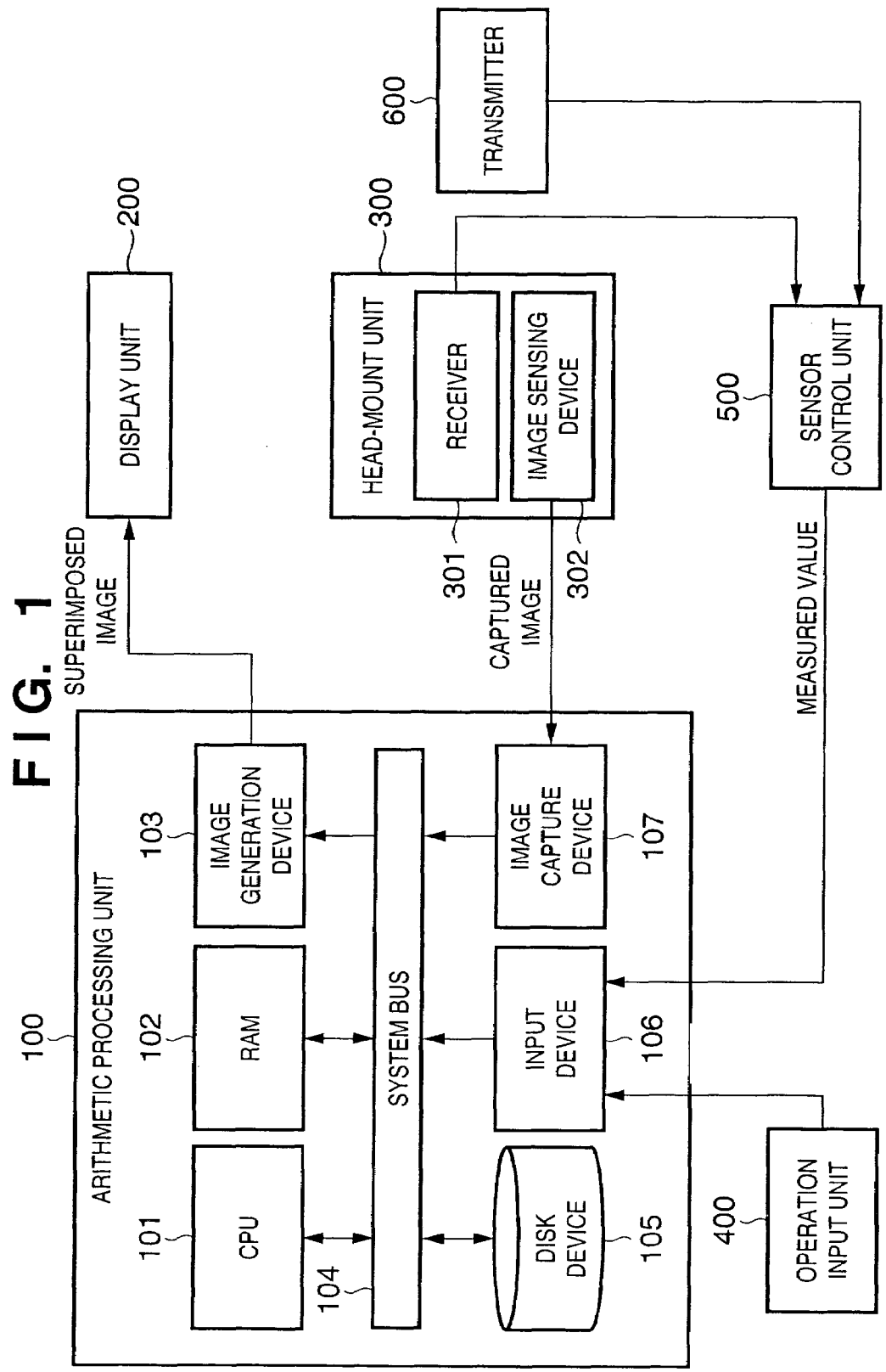
FIG. 1 is a schematic block diagram for explaining the arrangement of a calibration apparatus according to the first embodiment of the present invention.

Referring to FIG. 1, reference numeral 100 denotes an arithmetic processing unit which comprises a computer or the like. The arithmetic processing unit 100 includes a CPU 101, RAM 102, image generation device 103, system bus 104, disk device 105, input device 106, and image capture device 107.

The CPU 101 controls a calibration process on the basis of a calibration program. The CPU 101 is connected to the system bus 104, and can communicate with the RAM 102, image generation device 103, disk device 105, input device 106, and image capture device 107.

The RAM 102 is implemented by a main storage device such as a memory or the like. The RAM 102 temporarily stores a program code of the calibration program, program control information, the world and image coordinate positions of the markers, calibration information calculated by this apparatus, and the like via the system bus 104.

The image generation device 103 is implemented by a device such as a graphics card or the like. The image generation device 103 outputs image information generated by a program which is executed by the CPU 101 to a display unit 200 via the system bus 104.

The system bus 104 serves as a communication path to which respective devices which form the arithmetic processing unit 100 are connected to communicate with each other.

The disk device 105 is implemented by an auxiliary storage device such as a hard disk or the like. The disk device 105 stores the program code of the calibration program, the program control information, the world and image coordinate positions of the markers, the calibration information calculated by this apparatus, and the like.

The input device 106 is implemented by various interface devices. The input device 106 receives signals from devices externally connected to the arithmetic processing unit 100 as data, and writes the data in the RAM 102 via the system bus 104.

The image capture device 107 is implemented by a device such as a video/image capture card or the like. The image capture device 107 receives an image output from an image sensing device 302, and writes image data in the RAM 102 via the system bus 104.

Reference numeral 200 denotes a display unit which is implemented by a display device such as a CRT monitor, liquid crystal monitor, or the like. The display unit 200 is used to display a video signal output from the image generation device 103, and to present the result to the user of this apparatus.

Reference numeral 300 denotes a head-mount unit, which has a sensor that is to undergo calibration by this calibration apparatus. The head-mount unit 300 comprises a receiver 301 which forms the sensor, and the image sensing device 302 as an object whose position and orientation are to be measured by the sensor.

The receiver 301 is implemented by a device for measuring a magnetic field generated by a transmitter 600 in, e.g., a magnetic sensor. The magnetic field value measured by the receiver 301 is output as the sensor output to a sensor control unit 500, which converts the measured value into parameters that represent a 3D position and orientation.

The image sensing device 302 is implemented by an image sensing device such as a CCD camera or the like. A video signal sensed by the image sensing device 302 is sent to the image capture device 107.

An operation input unit 400 is implemented by input devices such as a keyboard, mouse, and the like, which are used to control the arithmetic processing unit 100. The operation input unit 400 outputs an operation signal to the input device 106. The user (not shown) of this apparatus gives a control instruction of this apparatus by operating the operation input unit 400.

The sensor control unit 500 controls the receiver 301 and transmitter 500 in, e.g., a magnetic sensor, and calculates the 3D position and orientation information of the receiver 301 on the basis of information received from the receiver 301. The 3D position and orientation information calculated by the sensor control unit 500 are sent to the input device 106.

The transmitter 600 generates a magnetic field to make the sensor control unit 500 calculate the 3D position and orientation of the receiver 301 in, e.g., the magnetic sensor.

In this embodiment, the magnetic sensor is used as a 3D position and orientation sensor. However, the sensor to be used is not limited to the magnetic sensor. For example, an optical sensor, ultrasonic wave sensor, or the like may be used, and the types of sensors are not particularly limited as long as they can measure the 3D position and orientation. In this case, the receiver 301 serves as an object to be measured by the sensor, and the transmitter 600 serves as the origin of a sensor coordinate system when the sensor control unit 500 calculates the 3D position and orientation of the receiver 301.

Figure 2:
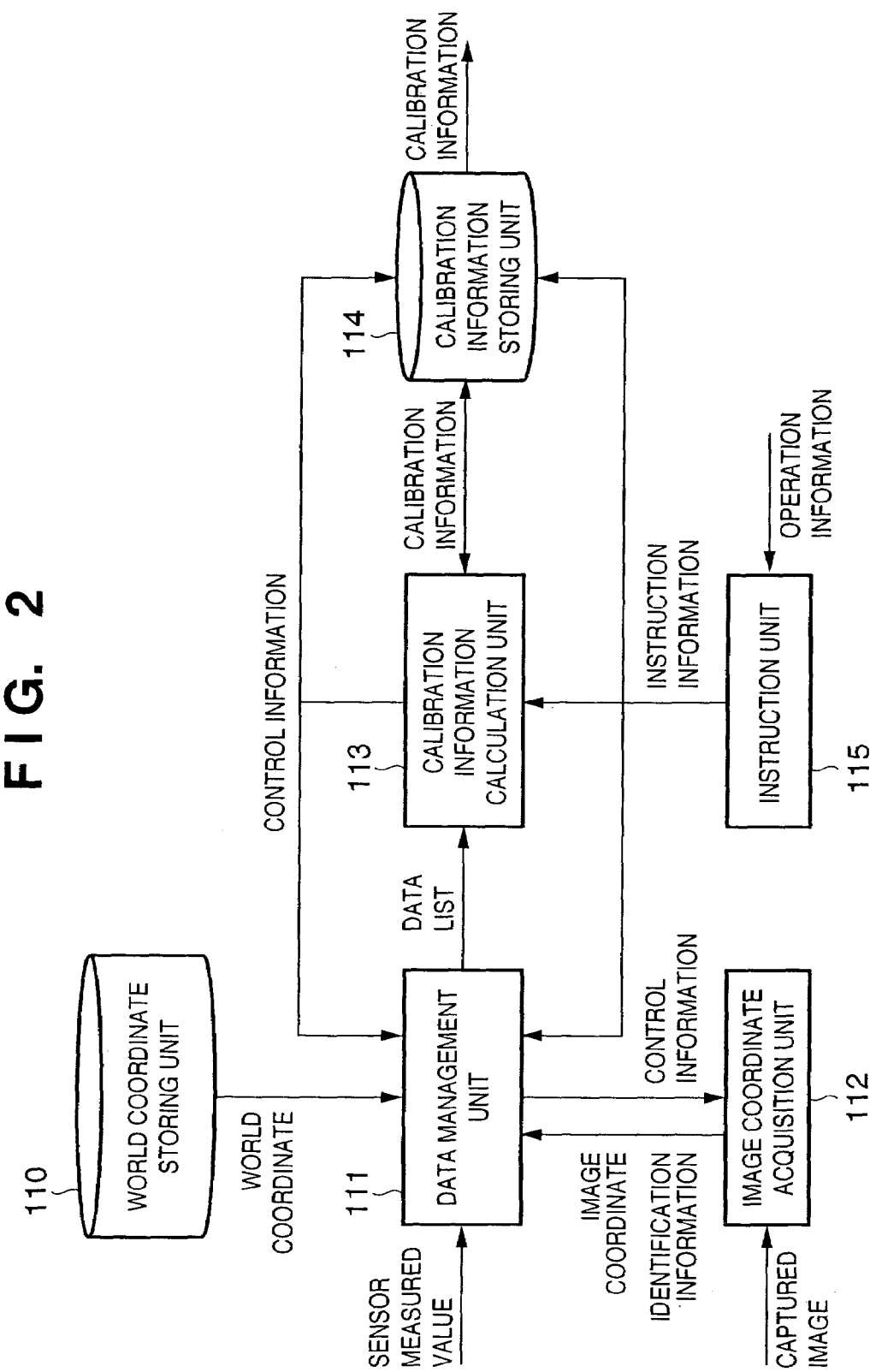
FIG. 2 is a block diagram for explaining the functional arrangement of the calibration apparatus according to the first embodiment of the present invention.

FIG. 2 is a block diagram showing the functional arrangement of the calibration apparatus of this embodiment. Processes of respective units in FIG. 2 are executed inside the arithmetic processing unit 100 shown in FIG. 1.

A world coordinate storing unit 110 stores coordinate data of the respective markers on the world coordinate system, and outputs these data in accordance with a request from a data management unit 111. Also, the world coordinate storing unit 110 stores information (marker color information, identification information) unique to each marker in association with the coordinate data of the markers.

Upon receiving a data acquisition request from an instruction unit 115, the data management unit 111 receives the image coordinate position and identification information of a given marker from an image coordinate acquisition unit 112, receives the world coordinate position of the marker corresponding to the identification information from the world coordinate storing unit 110, adds a set of the image coordinate position, world coordinate position, and identification information in a data list, and stores that list. If the data management unit 111 receives the image coordinate position of a given marker alone but does not receive any identification information, only the image coordinate position is added to the data list. Upon receiving a data delete request from the instruction unit 115, the data management unit 111 deletes data from the data list. Furthermore, upon receiving a data identification request from the instruction unit 115, the data management unit 111 changes data in the data list by changing the combinations of image coordinate positions, world coordinate positions, and identification information of markers. Moreover, the data management unit 111 outputs the generated data list to a calibration information calculation unit 113 in accordance with a request from the calibration information calculation unit 113.

The image coordinate acquisition unit 112 specifies the coordinate position and identification information of a marker which appears in an image (to be referred to as a real image hereinafter), which is sensed by the image sensing device 302 (FIG. 1) and is captured by the image captured device 107 (FIG. 1), and outputs such information to the data management unit 111 in accordance with a request from the data management unit 111.

Upon receiving a calibration information calculation instruction from the instruction unit 115, the calibration information calculation unit 113 receives the data list from the data management unit 111, calculates calibration information based on the data list, and outputs the calculated calibration information to a calibration information storing unit 114.

The calibration information storing unit 114 stores the calibration information calculated by the calibration information calculation unit 113, and outputs or changes the held calibration information, or saves the calibration information in a file in accordance with a request from the instruction unit 115. Upon receiving an output request from the instruction unit 115, the unit 114 outputs the calibration information. Upon receiving a calibration information change request from the instruction unit 115, the unit 114 changes the value of the held calibration information. Upon receiving a file save request from the instruction unit 115, the unit 114 generates a file on the disk device 105, and saves the calibration information in that file. Upon receiving a file load request from the instruction unit 115, the unit 114 discards the currently held calibration information, loads the designated file from the disk device 105, and sets the loaded value as new current calibration information. Upon receiving a reset request from the instruction unit 115, the unit 114 discards the currently held calibration information, and sets a default value of calibration information held upon launching this apparatus as new current calibration information. Also, the calibration information storing unit 114 outputs held calibration information to the calibration information calculation unit 113 in accordance with a request from the calibration information calculation unit 113. The calibration information output to the calibration information calculation unit 113 is used as an initial value when the calibration information calculation unit 113 calculates calibration information.

The instruction unit 115 outputs a data acquisition request, data delete request, and data identification request to the data management unit 111 in response to a data acquisition command, data delete command, and data identification command input from the user of this apparatus, respectively. Upon receiving a calibration information calculation command, the unit 115 outputs a calibration information calculation request to the calibration information calculation unit 113.

Figure 3:
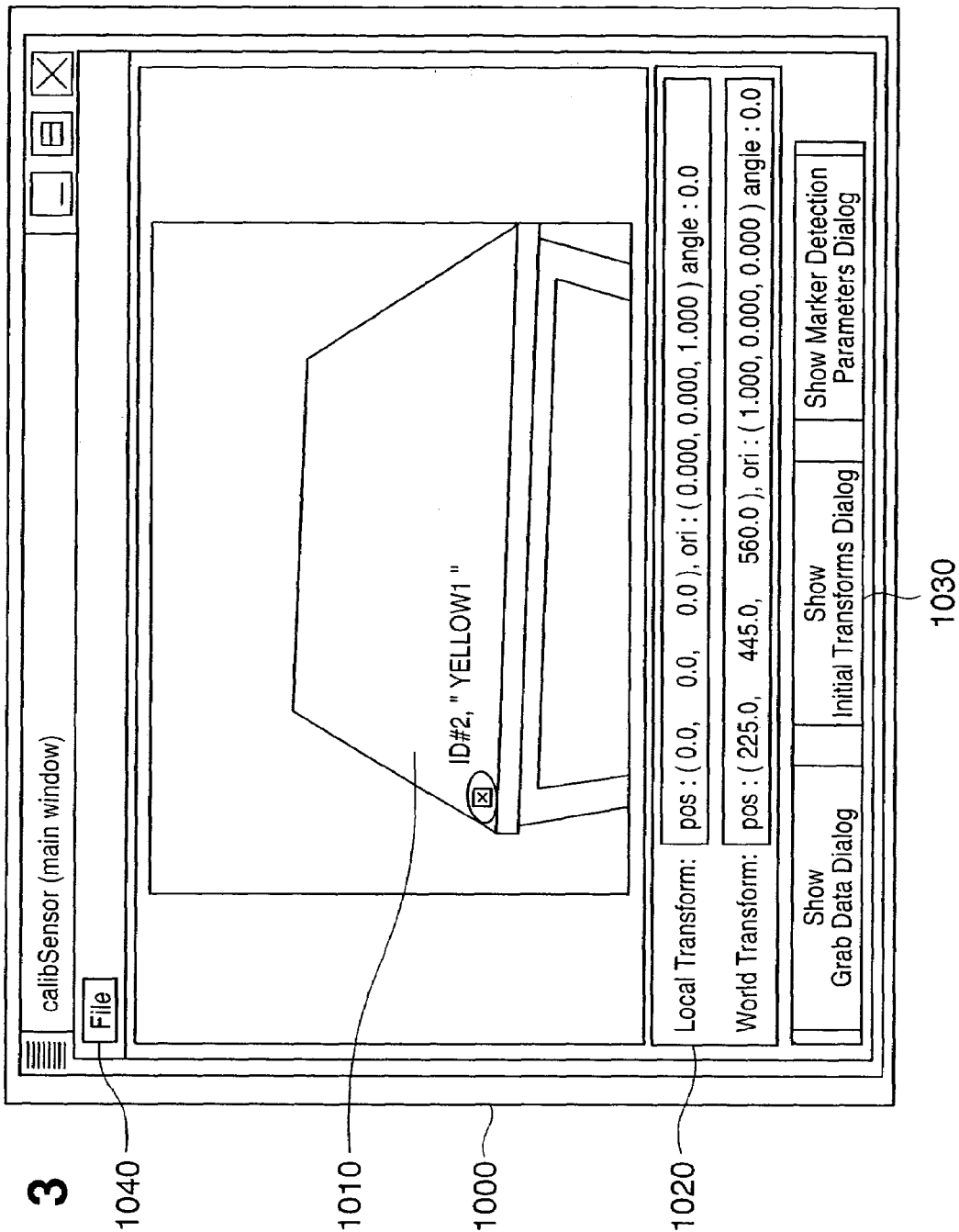
FIG. 3 is a view for explaining a GUI presented by the calibration apparatus according to the first embodiment.
Figure 4:
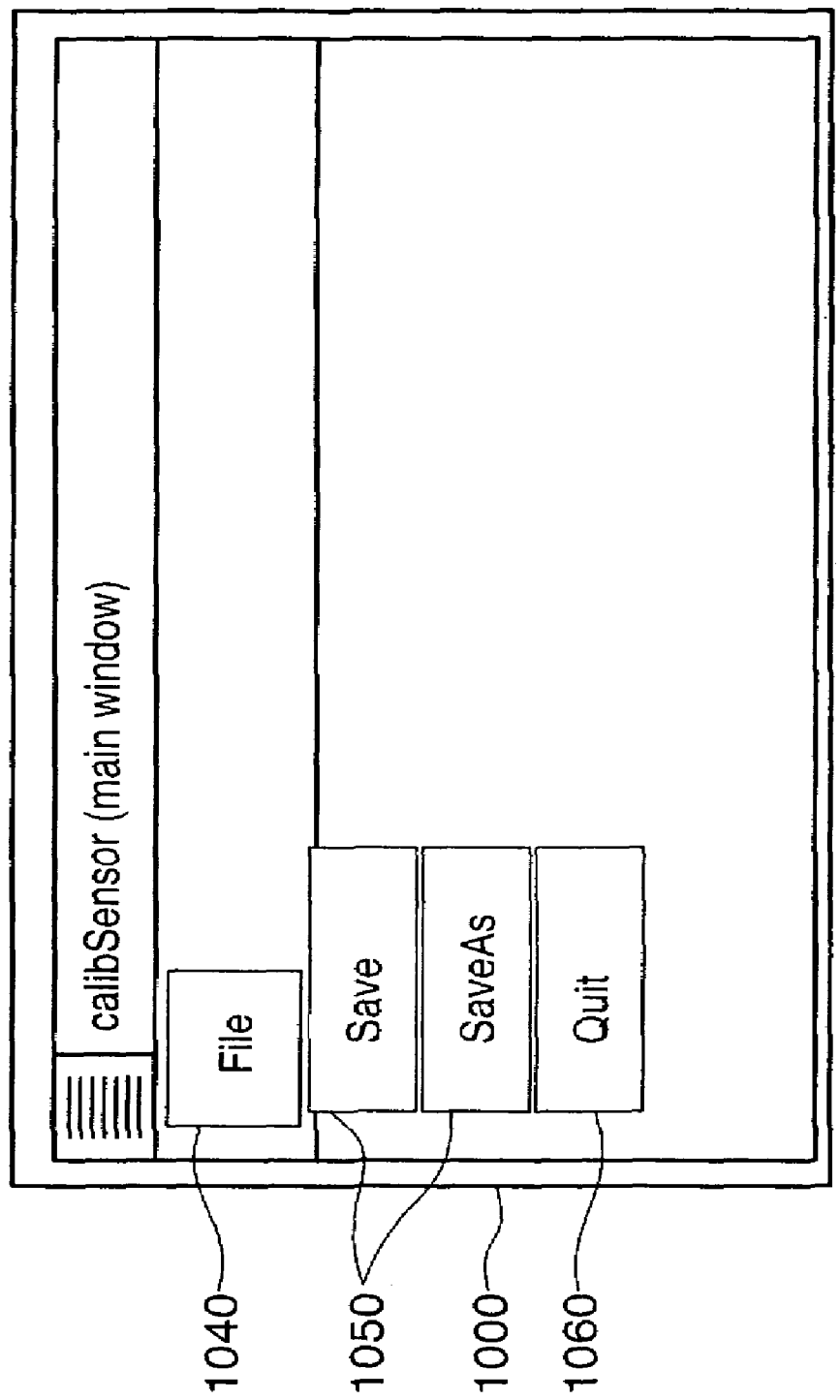
FIG. 4 is a view for explaining a file menu of the GUI presented by the calibration apparatus according to the first embodiment.

In this embodiment, the user of this apparatus gives an instruction to the instruction unit 115 using a GUI shown in FIG. 3. The GUI shown in FIG. 3 is formed by a main window 1000, image display area 1010, calibration information display area 1020, operation buttons 1030, and file menu 1040. As shown in FIG. 4, the file menu 1040 includes a save sub-menu 1050, and quit sub-menu 1060.

On the image display area 1010, a real image is displayed. Also, a mark indicating the coordinate position of a marker specified by the image coordinate acquisition unit 112, and its identification information are superimposed on the real image.

Figure 5:
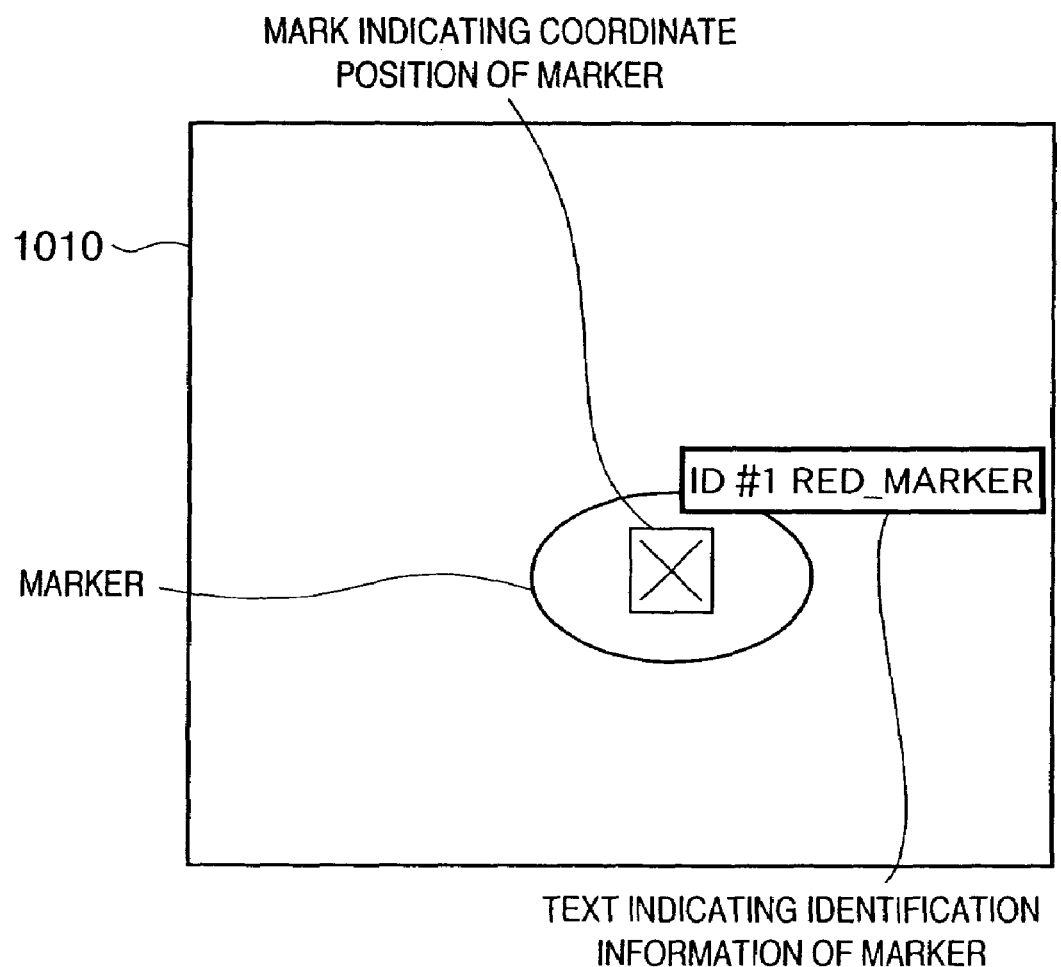
FIG. 5 is a view for explaining a state wherein a mark indicating the image coordinate position of a marker, and additional information are superimposed on a real image on the GUI presented by the calibration apparatus according to the first embodiment.

FIG. 5 shows a state wherein the mark which indicates the coordinate position of a marker specified by the image coordinate acquisition unit 112, and its identification information are superimposed on the real image displayed on the image display area 1010. In FIG. 5, an ellipse indicates a marker which appears in the real image. Also, the image coordinate position of the marker specified by the image coordinate acquisition unit 112 is indicated by a boxed mark X. Furthermore, text which indicates a marker name is superimposed in association with the identification information of the marker specified by the image coordinate acquisition unit 112.

By superimposing the mark at the image coordinate position of the marker, the user of this apparatus can confirm the coordinate position specified by the image coordinate acquisition unit 112 at a glance.

Also, by superimposing the identification information of the marker, the user of this apparatus can confirm, at a glance, which of markers is specified by the image coordinate acquisition unit 112.

In this example, the boxed mark X is superimposed to indicate the image coordinate position of the marker. However, the mark to be superimposed is not limited to the boxed mark X. For example, various symbols or icons such as ○, X, □, arrows, and the like may be used, and any other marks may be used as long as the user can visually confirm the image coordinate position of the marker specified by the image coordinate acquisition unit 112.

Also, text indicating the name is superimposed as the identification information of the marker. However, the identification information to be superimposed is not limited to text. For example, the user may identify the marker using an icon, image, or the like, or by changing the color of text, icon, image, or the like or that of the marker itself. That is, any other types of identification information may be used as long as the user of this apparatus can confirm correspondence between the marker which appears in the real image, and the actual marker.

Figure 6:
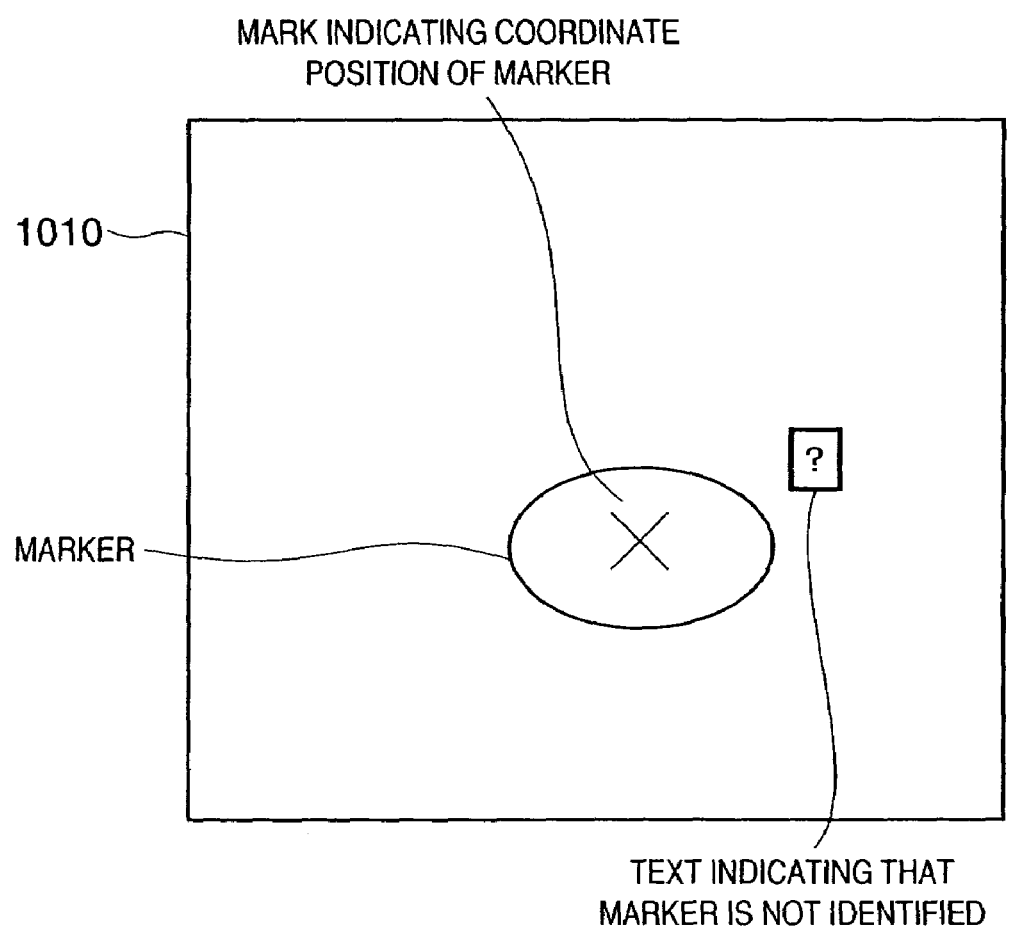
FIG. 6 is a view for explaining a state wherein the mark indicating the image coordinate position of the marker, and additional information are superimposed on a real image on the GUI presented by the calibration apparatus according to the first embodiment, when the marker is not identified.

FIG. 6 shows a display example on the image display area 1010 when the image coordinate acquisition unit 112 specifies the image coordinate position of the marker, but cannot specify identification information, and the data management unit 111 does not generate a set of the world coordinate position, image coordinate position, and identification information of the marker. In the following description, determining correspondence among the world coordinate position, image coordinate position, and identification information of the marker, and generating a set of these data by the data management unit 111 will be expressed by "identifying a marker".

In FIG. 6, the mark X is superimposed on the real image at the image coordinate position of the marker. Also, in FIG. 6, text "?" is superimposed on the real image so as to indicate that the marker cannot be identified. When the marker has been identified, the boxed mark X and identification information of the marker are superimposed on the image display area 1010, as shown in FIG. 5; when the marker has not been identified, the display method is switched, as shown in, e.g., FIG. 6.

The display method used depending on whether or not the marker has been identified need not be switched on the entire image display area 1010, but may be independently switched for each marker which appears on the image display area 1010.

Figure 7:
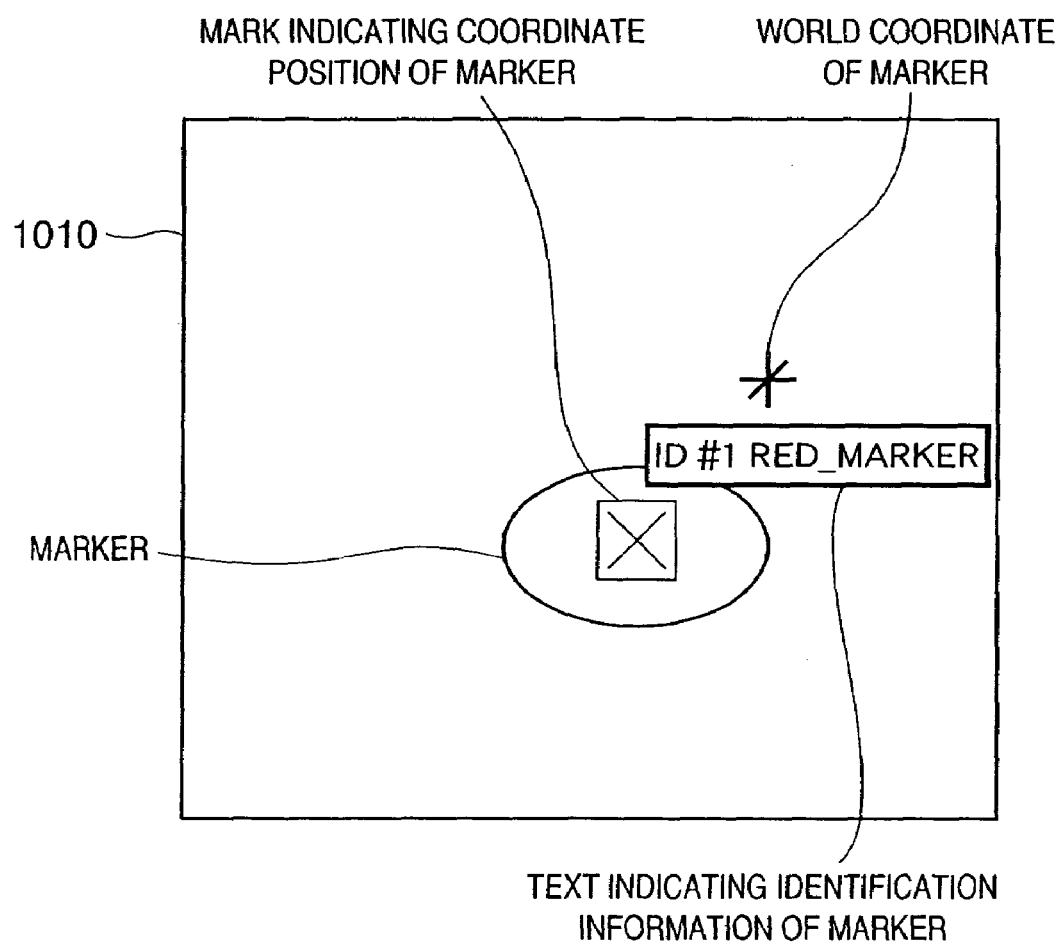
FIG. 7 is a view for explaining a state wherein the world coordinate position of the marker is rendered as CG, and is superimposed on a real image on the GUI presented by the calibration apparatus according to the first embodiment.

FIG. 7 shows a state wherein the coordinate position of the marker on the world coordinate system, which is held by the world coordinate storing unit 110, is rendered by CG from the viewpoint of the image sensing device 302, on the basis of the current calibration information and the position and orientation information of the receiver 301, and that CG image is superimposed on the real image displayed on the image display area 1010.

If calibration is correctly done by this apparatus, the coordinate position of the marker specified by the image coordinate acquisition unit 112 theoretically matches the projected position of the world coordinate position of that marker superimposed on the real image. The user of this apparatus can visually confirm the precision of calibration done by this apparatus by checking the registration error between the coordinate position of the marker specified by the image coordinate acquisition unit 112 and the projected position of the world coordinate positions of that marker.

In this embodiment, the world coordinate position of the marker is rendered by CG. However, an object to be rendered by CG is not limited to the world coordinate position of the marker.

For example, in order to allow the user to confirm the appearance of the world coordinate system on the real image, the coordinate axes, plane, world coordinate origin, and the like, which define the world coordinate system, may be rendered.

When some functions of this calibration apparatus are implemented using an image display apparatus that presents mixed reality, a virtual world and virtual object used upon presenting mixed reality may be rendered by CG.

When the image coordinate acquisition unit 112 executes a process for extracting a color region from an image so as to specify the marker coordinate position, the image display area 1010 may display an image indicating the result of the color region extraction process in place of the real image. In this way, the user of this apparatus can easily adjust parameters for the color region extraction process.

The user of this apparatus can designate the image coordinate position in the image display area 1010 using a pointing device such as a mouse or the like included in the instruction unit 115. For example, the user himself or herself of this apparatus can specify the coordinate position of a marker (in the real image), which is to be done by the image coordinate acquisition unit 112. Also, the user of this apparatus can select a desired marker which appears in the real image, can change processing parameters for that marker, and can manually input identification information of the marker.

The calibration information display area 1020 displays the current calibration information held by the calibration information storing unit 114.

The operation buttons 1030 are used to control the behavior and GUI of this apparatus when the user of this apparatus selects each button region using a pointing device such as a mouse or the like. In this embodiment, when the user of this apparatus selects one of the operation buttons 1030, a data acquisition dialog, initial value setting dialog, or detection parameter setting dialog is newly displayed.

The file menu 1040 displays the save sub-menu 1050 and quit sub-menu 1060 when the user of this apparatus selects a menu region using a pointing device such as a mouse or the like.

The save sub-menu 1050 gives an instruction to this apparatus when the user of this apparatus selects a sub-menu region using a pointing device such as a mouse or the like. Upon selection of the save sub-menu 1050, the instruction unit 115 issues a file save command, and outputs a file save request to the calibration information storing unit 114.

The quit sub-menu 1060 gives an instruction to this apparatus when the user of this apparatus selects a sub-menu region using a pointing device such as a mouse or the like. Upon selection of the quit sub-menu 1060, this calibration apparatus quits. When the calibration information storing unit 114 stores calibration information which is not saved yet, the instruction unit 115 issues a file save command, and outputs a file save request to the calibration information storing unit 114. The instruction unit 115 waits until the calibration information storing unit 114 completes a file save process, and then quits this calibration apparatus.

Figure 8:
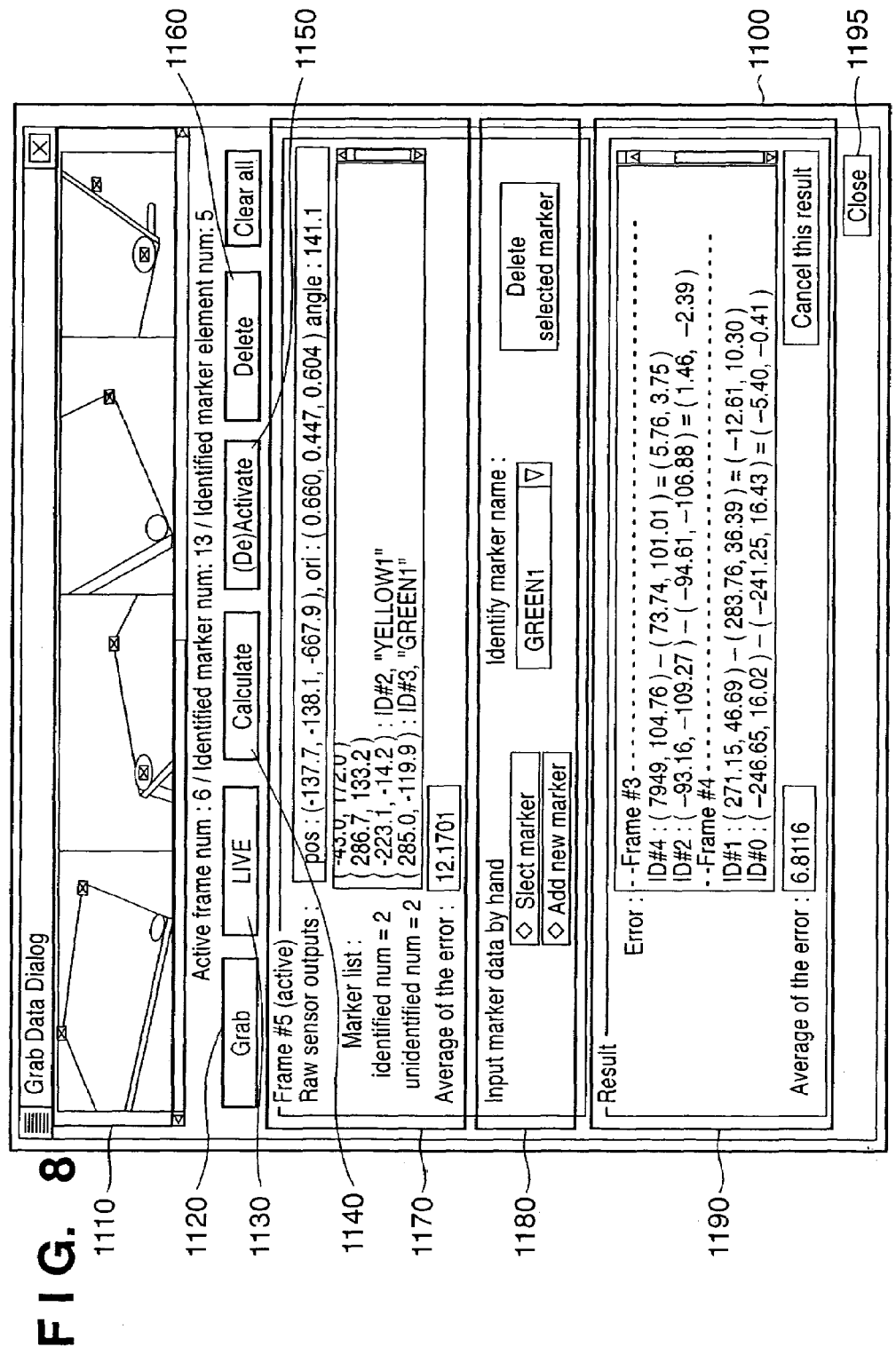
FIG. 8 is a view for explaining a data acquisition dialog of the GUI presented by the calibration apparatus according to the first embodiment.

FIG. 8 shows an example of the data acquisition dialog. A data acquisition dialog (grab data dialog) 1100 in FIG. 8 includes a data list display area 1110, data acquisition operation button 1120, display image switch button 1130, calibration information calculation button 1140, selected data deactivate/activate button 1150, selected data delete button 1160, selected data display area 1170, selected data manipulation area 1180, error display area 1190, and data acquisition dialog close button 1195.

The data list display area 1110 displays thumbnails of real images corresponding to the data list which has been acquired so far. When the user of this apparatus selects one of these thumbnails, data corresponding to that thumbnail is selected from the data list, and is displayed on the selected data display area 1170. Also, the data corresponding to that thumbnail is selected. The selected data is to be processed upon depression of the selected data deactivate/activate button 1150 or selected data delete button 1160.

At this time, the image display area 1010 in FIG. 3 displays a real image corresponding to the selected data. Since the data list display area 1110 displays thumbnails of real images, and it is difficult for the user of this apparatus to confirm details from the thumbnail, the image display area 1010 displays the real image without reducing it in size. Also, the image coordinate position, world coordinate position, and identification information of a marker selected from the data list are superimposed on the real image by the method described in the paragraphs of the image display area 1010.

The data acquisition button 1120 gives an instruction to this apparatus when the user of this apparatus selects a button region using a pointing device such as a mouse or the like. Upon depression of the data acquisition button 1120, the instruction unit 115 issues a data acquisition command, and outputs a data acquisition request to the data management unit 111. Also, a real image at that time is additionally displayed on the data list display area.

The display image switch button 1130 gives an instruction to this apparatus when the user of this apparatus selects a button region using a pointing device such as a mouse or the like. Upon depression of the display image switch button 1130, a mode of an image to be displayed on the image display area 1010 is switched. The user of this apparatus can select one of a "live video display mode" for displaying the currently acquired real image, and an "acquired data display mode" for displaying a real image currently selected on the data list display area 1110. Upon depression of the display image switch button 1130, if the current mode is the live video display mode, it is switched to the acquisition data display mode, and vice versa.

The calibration information calculation button 1140 gives an instruction to this apparatus when the user of this apparatus selects a button region using a pointing device such as a mouse or the like. Upon depression of the calibration information calculation button, the instruction unit 115 issues a calibration information calculation command, and outputs a calibration information calculation request to the calibration information calculation unit 113.

The selected data deactivate/activate button 1150 gives an instruction to this apparatus when the user of this apparatus selects a button region using a pointing device such as a mouse or the like. Upon depression of the selected data deactivate/activate button 1150, if data (captured image) currently selected on the data list display area 1110 is active, that data is deactivated and is excluded from an object of the calibration information calculation process. If the currently selected data is inactive, that data is activated.

The selected data delete button 1160 gives an instruction to this apparatus when the user of this apparatus selects a button region using a pointing device such as a mouse or the like. Upon depression of the selected data delete button 1160, the instruction unit 115 issues a data delete command, and outputs a data delete request to the data management unit 111. Also, the thumbnail of the currently selected real image is erased from the data list display area 1110.

The selected data display area 1170 displays data selected by the user of this apparatus from the data list display area 1110.

Figure 9:
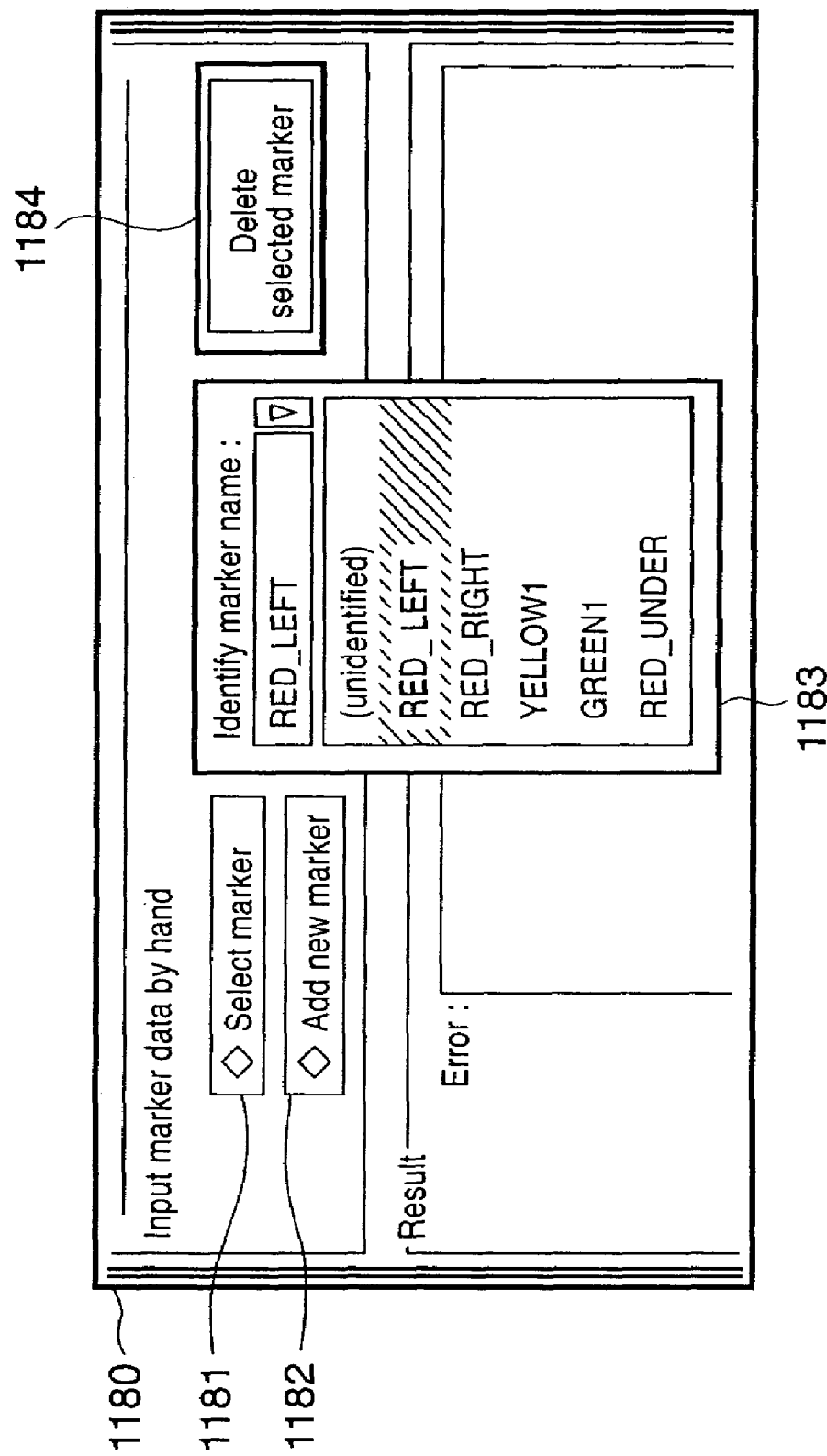
FIG. 9 is a view for explaining a selected data manipulation area on the dialog shown in FIG. 8.

The selected data manipulation area 1180 is used when the user of this apparatus manipulates the selected data. FIG. 9 shows details of the selected data manipulation area 1180.

The selected data manipulation area 1180 includes a marker select button 1181, marker add button 1182, marker identification information select menu 1183, and marker delete button 1184.

The marker select button 1181 gives an instruction to this apparatus when the user of this apparatus selects a button region using a pointing device such as a mouse or the like. Upon depression of the marker select button 1181, a manipulation mode is set in a "marker select mode". When the user of this apparatus selects the vicinity of the mark which indicates the coordinate position of the marker displayed on the image display area 1010 while the marker select mode is set, that marker is activated.

The marker add button 1182 gives an instruction to this apparatus when the user of this apparatus selects a button region using a pointing device such as a mouse or the like. Upon depression of the marker add button 1182, the manipulation mode is set in a "marker add mode". When the user of this apparatus selects an arbitrary portion of the image display area 1010 while the marker add mode is set, a new marker having that image coordinate position as the marker coordinate position is set, and is added to the data list. Furthermore, the added marker is activated.

The marker identification information select menu 1183 gives an instruction to this apparatus when the user of this apparatus selects a menu region using a pointing device such as a mouse or the like. Upon selection of the marker identification information select menu 1183, a list of marker identification information saved in the data list is displayed. In this embodiment, a character string indicating the marker name is used as the marker identification information. The user of this apparatus selects one marker identification information from the displayed list using a pointing device such as a mouse or the like. Upon selection of the marker identification information, the instruction unit 115 issues a data identification command, and outputs the selected identification information and active marker information to the data management unit 111 together with a data identification request.

The marker delete button 1184 gives an instruction to this apparatus when the user of this apparatus selects a button region using a pointing device such as a mouse or the like. Upon depression of the marker delete button 1184, the currently selected marker is deleted from the data list.

The error display area 1190 displays calibration errors obtained when the calibration information calculation unit 113 calculates calibration information. In this embodiment, two different types of calibration errors, i.e., errors with respect to respective markers in the data list, and the average of errors of all data are displayed.

When calibration information calculated by the calibration information calculation unit 113 has insufficient precision, or when the solution does not converge upon calculation of calibration information, the user of this apparatus can easily specify a marker as that cause by confirming calibration errors with respect to respective markers.

By confirming the average of errors of all data, the activation/deactivation results of data used in calculation of calibration information using the selected data deactivate/activate button can be evaluated.

The data acquisition dialog close button 1195 gives an instruction to this apparatus when the user of this apparatus selects a button region using a pointing device such as a mouse or the like. Upon selection of the data acquisition dialog close button 1195, the data acquisition dialog is closed. Even when the data acquisition dialog is closed, the contents of the data list are held.

Figure 10:
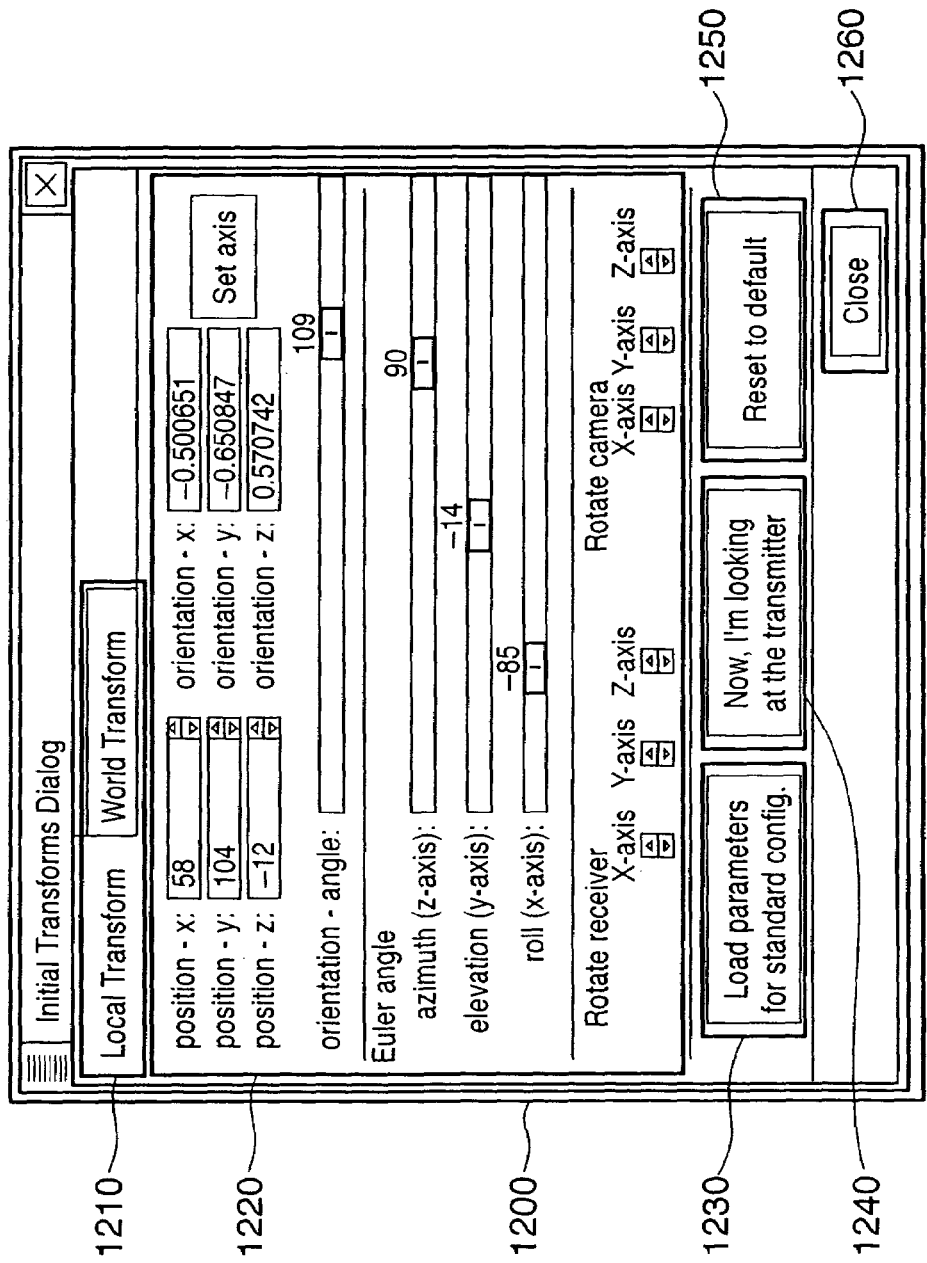
FIG. 10 is a view for explaining an initial value setup dialog of the GUI presented by the calibration apparatus according to the first embodiment.
Figure 19:
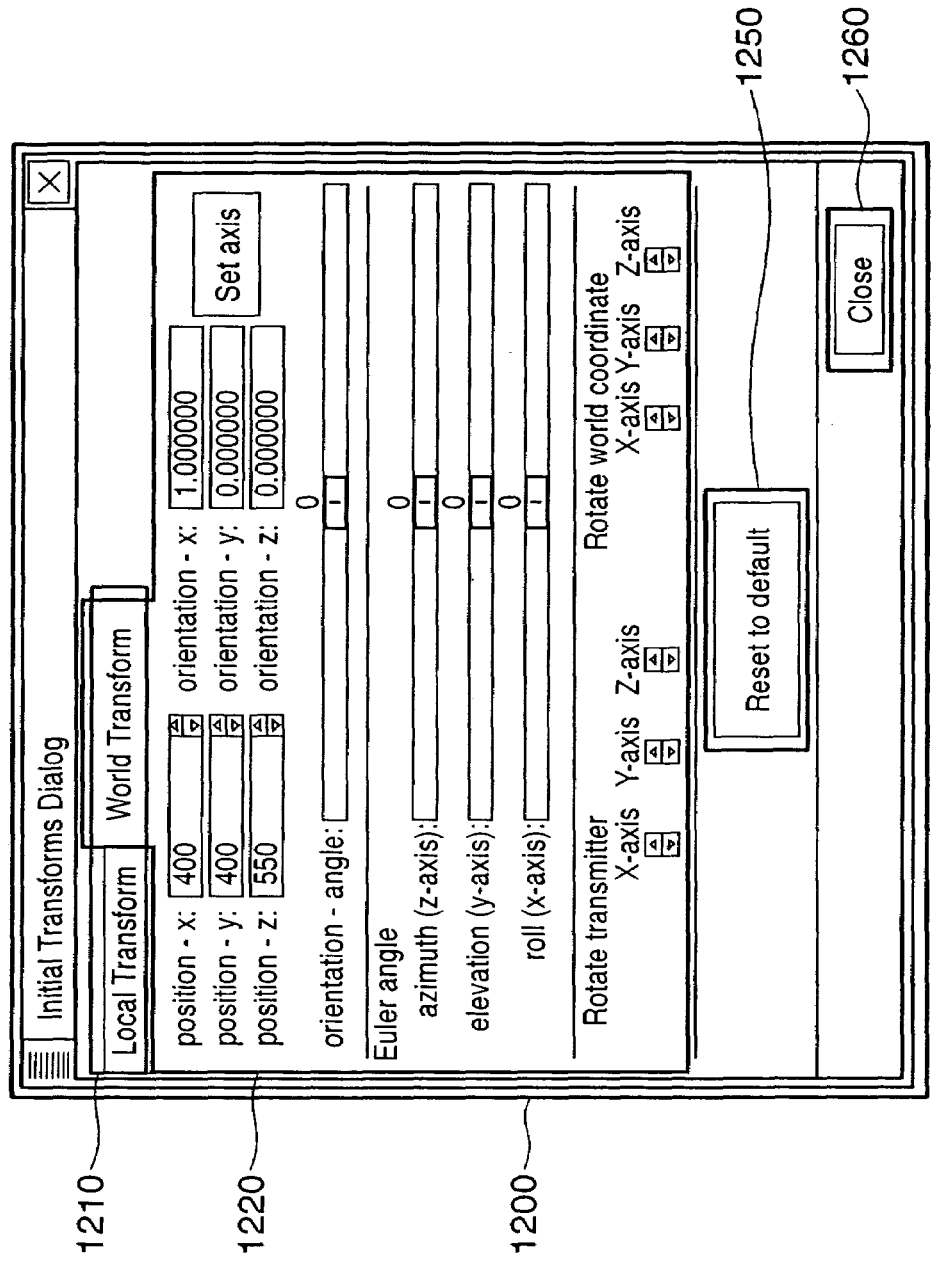
FIG. 19 is a view for explaining an initial value setting dialog of the GUI presented by the calibration apparatus according to the first embodiment.

FIGS. 10 and 19 show an example of an initial value setting dialog (initial transforms dialog) 1200. The initial value setting dialog includes parameter type select tubs 1210, a Local Transform setting area 1220, standard configuration designation button 1230, transmitter observation button 1240, reset button 1250, initial value setting dialog close button 1260, and World Transform setting area 1270 (FIG. 19).

The parameter type select tubs 1210 are used to select the type of calibration information for which an initial value is to be set when the user of this apparatus selects one of tub regions using a pointing device such as a mouse or the like. There are two tub regions "Local Transform" and "World Transform". Upon selection of the "Local Transform" region, a calibration information mode is set in a "Local Transform mode" that sets first parameters (Local Transform) required to transform the measurement value of the sensor into the position and orientation of the image sensing unit. Upon selection of the "World Transform" region, the calibration information mode is set in a "World Transform mode" that sets second parameters (World Transform)

required to transform the position and orientation on the sensor coordinate system into those on the world coordinate system. FIG. 10 illustrates the state in the Local Transform mode.

The Local Transform setting area 1220 is displayed when the calibration information mode is the Local Transform mode. On the Local Transform setting area 1220, the user of this apparatus can set Local Transform values by various means such as buttons, sliders, spin buttons, numerical value input from a keyboard, and the like. In this embodiment, calibration information parameters are set by using one or a plurality of the following methods solely or in combination.

First, the position and a vector that defines rotation axis of the receiver 301 viewed from the image sensing device 302, and a rotation angle about that axis are designated.

Second, the position and Euler angles of the receiver 301 viewed from the image sensing device 302 are designated.

Third, rotation angles about the X-, Y-, and Z-axes of the receiver 301 viewed from the image sensing device 302, and those about the X-, Y-, and Z-axes of the image sensing device 302 viewed from the receiver 301 are designated.

Upon completion of the setups of the calibration information parameters, the instruction unit 115 issues a calibration information change command, and outputs a calibration information change request to the calibration information storing unit 114.

The standard configuration designation button 1230 is displayed when the calibration mode is the Local Transform mode, and gives an instruction to this apparatus when the user of this apparatus selects a region of the standard configuration designation button 1230 using a pointing device such as a mouse or the like. Upon designation of the standard configuration designation button 1230, the instruction unit 115 issues a calibration information load command, and outputs a calibration information load request to the calibration information storing unit 114. As a result, standard Local Transform values are set.

The transmitter observation button 1240 is displayed when the calibration mode is the Local Transform mode, and gives an instruction to this apparatus when the user of this apparatus selects a region of the transmitter observation button 1240 using a pointing device such as a mouse or the like.

Upon selection of the transmitter observation button 1240, approximate values of Local Transform can be automatically calculated using the sensor measured value.

Figure 14A:
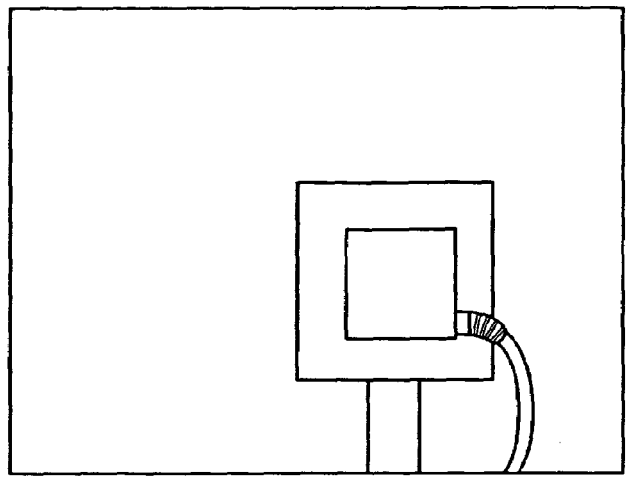
FIGS. 14A to 14C are views for explaining a sequence for automatically calculating approximate Local Transform values using a sensor measurement value in the calibration apparatus according to the first embodiment.

After the user adjusts the position and orientation of the image sensing device 302 so that the image of the transmitter 600 of the sensor is captured at nearly the center of the captured image, as shown in FIG. 14A, he or she clicks the transmitter observation button 1240. Based on the sensor measured value at that time, approximate values of Local Transform are calculated.

Upon clicking the transmitter observation button 1240, the instruction unit 115 issues a calibration information calculation command, and outputs a calibration information calculation request to the calibration information calculation unit 113. At this time, the calibration information calculation unit 113 receives the current sensor measured value from the data management unit 111, and calculates calibration information (Local Transform) between the image sensing device 302 and receiver 301 on the basis of that sensor measured value and information indicating that "the image of the transmitter 600 is captured nearly at the center of the sensed image" in, e.g., the following sequence.

Assume that the distance between the receiver 301 and image sensing device 302 is sufficiently negligible, i.e., the positions of the receiver 301 and image sensing device 302 are equal to each other. Then, an approximate position $P_{SC}=[x_{SC}\ y_{SC}\ z_{SC}]^T$ of the image sensing device 302 on the sensor coordinate system can be obtained from the current sensor measured value. Since the image sensing device 302 directs to the transmitter 600 as the origin of the sensor coordinate system, a vector $V_Z$ that represents the Z-axis (axis extending from the origin of the image sensing device 302 in the vertically backward direction of the image sensing surface) of the image sensing device coordinate system can be obtained as a unit vector obtained by normalizing $P_{SC}$. Then, the outer product of an appropriate unit vector U different from $V_Z$, and $V_Z$ defines a Y-axis $V_Y$ of the image sensing device coordinate system, and that of $V_Y$ and $V_Z$ defines an X-axis $V_X$ of the image sensing device coordinate system. Based on $V_Z$, $V_Y$, and $V_X$ obtained in this way, the position and orientation $M_{SC}$ of the image sensing device 302 on the sensor coordinate system are determined as:

$$M_{SC} = \begin{bmatrix} & & & x_{SC} \\ V_X & V_Y & V_Z & y_{SC} \\ & & & z_{SC} \\ 0 & 0 & 0 & 1 \end{bmatrix} \quad (1)$$

Note that the "position and orientation of object B on arbitrary coordinate system A" are expressed using "4×4 matrix (modeling transformation matrix) $M_{AB}$ that implements coordinate transformation from coordinate system B defined by object B to coordinate system A". Since transformation of parameters of six values indicating the position and orientation from this matrix and its inverse transformation are fundamental matters of three-dimensional geometry, a detailed description thereof will be omitted.

Let $M_{RC}$ be the Local Transform (matrix that transforms the position and orientation of the receiver 301 to those of the image sensing device 302) to be calculated, and $M_{SR}$ be the position and orientation (current sensor measured value) of the receiver 301 on the sensor coordinate system. Then, we have:

$$M_{SC}=M_{SR} \cdot M_{RC} \quad (2)$$

From equation (2), since $$M_{RC}=M_{SR}^{-1} \cdot M_{SC} \quad (3)$$

and $M_{SR}$ is obtained as the sensor measured value, approximate values of Local Transform can be obtained from equation (3) using $M_{SC}$ given by equation (1).

Note that the calculation method of approximate values of Local Transform is not limited to this. For example, orientation $R_{SC}$ of the image sensing device 302 on the sensor coordinate system may be calculated as $R_{SC}=[V_Z\ V_Y\ V_X]$, and rotation matrix $R_{RC}=R_{SR}^{-1} \cdot R_{SC}$ that represents Local Transform may be calculated using orientation $R_{SR}$ of the receiver 301 on the sensor coordinate system obtained as the sensor measured value.

Figure 14B:
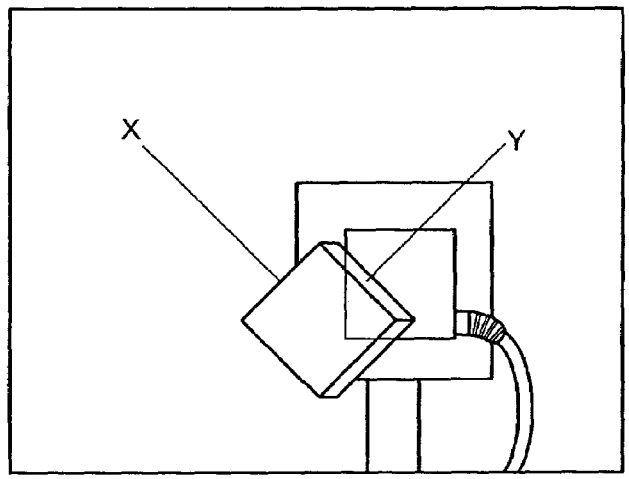

Theoretical values of the position and orientation of the transmitter 600 are calculated using the calculated approximate values, and a virtual image of the transmitter 600 is generated based on the theoretical values. In addition, the virtual image of the transmitter 600 is superimposed on the captured image at an image position corresponding to the theoretical values (FIG. 14B).

Figure 14C:
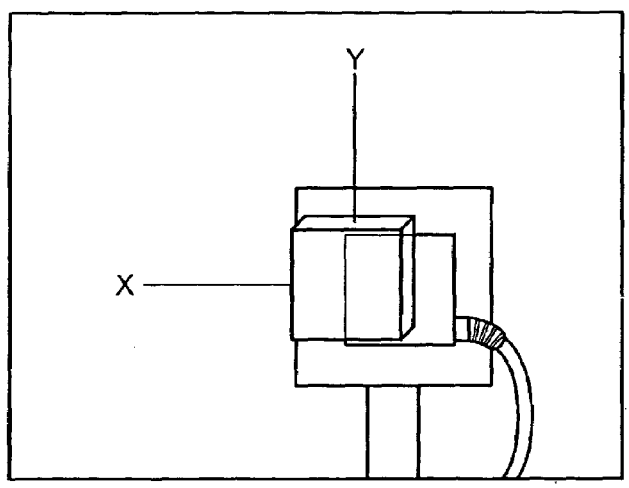

In Local Transform set using the transmitter observation button 1240, a rotation angle of the image sensing device in the Z-direction is indefinite. Hence, this parameter (a Z-orientation component of Local Transform) is roughly adjusted using an azimuth (z-axis) slider bar (parameter setting area 1220). The virtual image of the transmitter 600 is updated in real time in accordance with the adjustment result (FIG. 14C). Note that other parameters can also be adjusted.

Upon selection of "World Transform" of the parameter type select tab 1210, the calibration information mode is switched to the World Transform mode, and the World Transform setting area 1270 is displayed (FIG. 19) in place of the Local Transform setting area 1220.

On the World Transform setting area 1270, World Transform values can be set using various means such as buttons, sliders, spin buttons, numerical value input from a keyboard, and the like. In this embodiment, calibration information parameters are set by using one or a plurality of the following methods solely or in combination.

First, the position and a vector that defines rotation axis of the transmitter 600 on the world coordinate system, and a rotation angle about that axis are designated.

Second, the position and Euler angles of the transmitter 600 on the world coordinate system are designated.

Third, rotation angles about the X-, Y-, and Z-axes of the transmitter 600 on the world coordinate system, and those about the X-, Y-, and Z-axes of the origin of the world coordinate system viewed from the transmitter 600 are designated.

Upon completion of the setups of the calibration information parameters, the instruction unit 115 issues a calibration information change command, and outputs a calibration information change request to the calibration information storing unit 114.

The reset button 1250 gives an instruction to this apparatus when the user of this apparatus selects a button region using a pointing device such as a mouse or the like. Upon designation of the reset button 1250, the instruction unit 115 issues a reset command, and outputs a reset request to the calibration information storing unit 114.

The initial value setting dialog close button 1260 gives an instruction to this apparatus when the user of this apparatus selects a button region using a pointing device such as a mouse or the like. Upon selection of the initial value setting dialog close button 1260, the initial value setting dialog is closed. Even after the initial value setting dialog is closed, calibration information can be held.

In this manner, by selecting the transmitter observation button 1240 in the Local Transform mode, approximate values of Local Transform can be easily and automatically calculated using the sensor measured value without requiring any special preparation processes. Since the transmitter is an indispensable component in this system, the user need not execute any special processes for this process.

Figure 11:
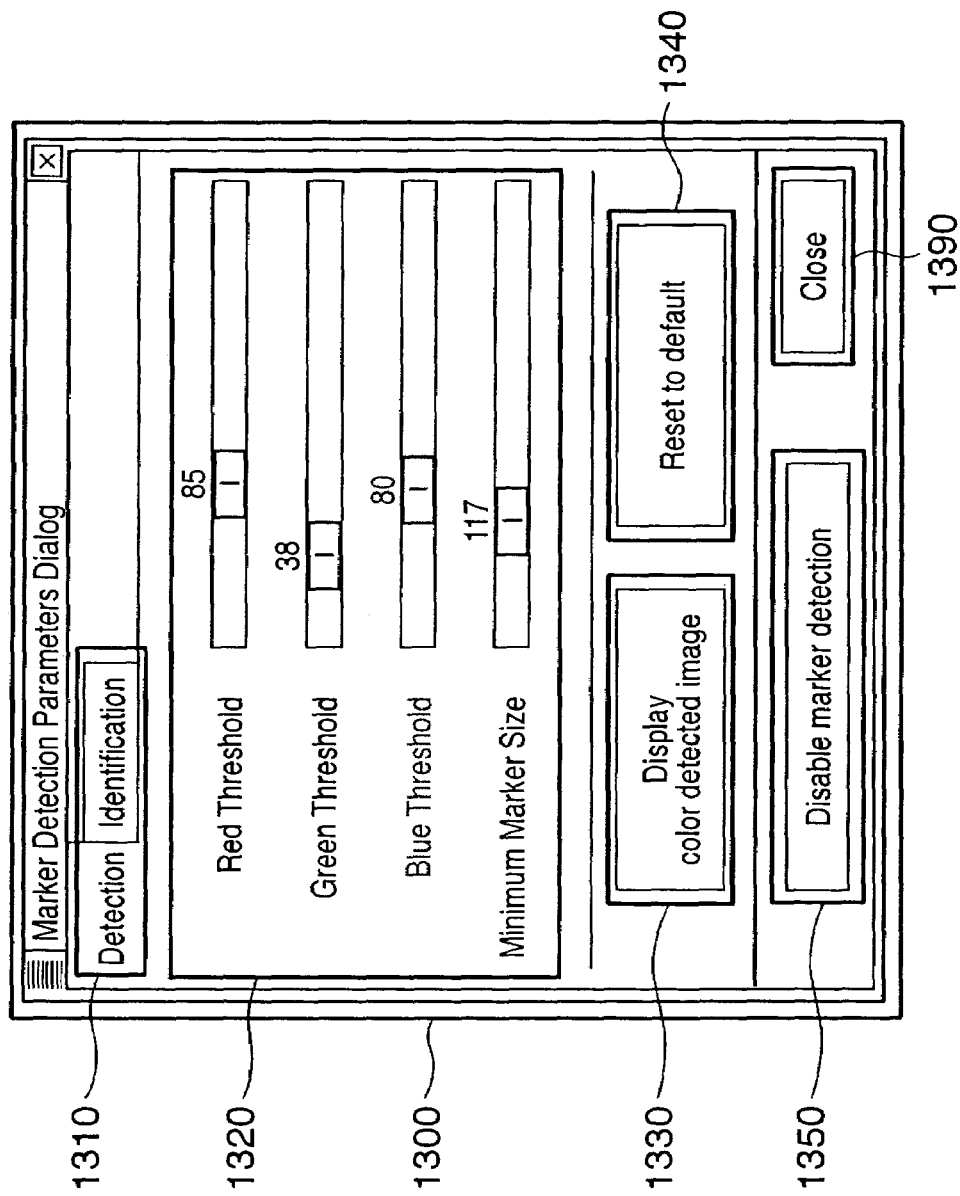
FIG. 11 is a view for explaining a detection parameter setup dialog of the GUI presented by the calibration apparatus according to the first embodiment.
Figure 12:
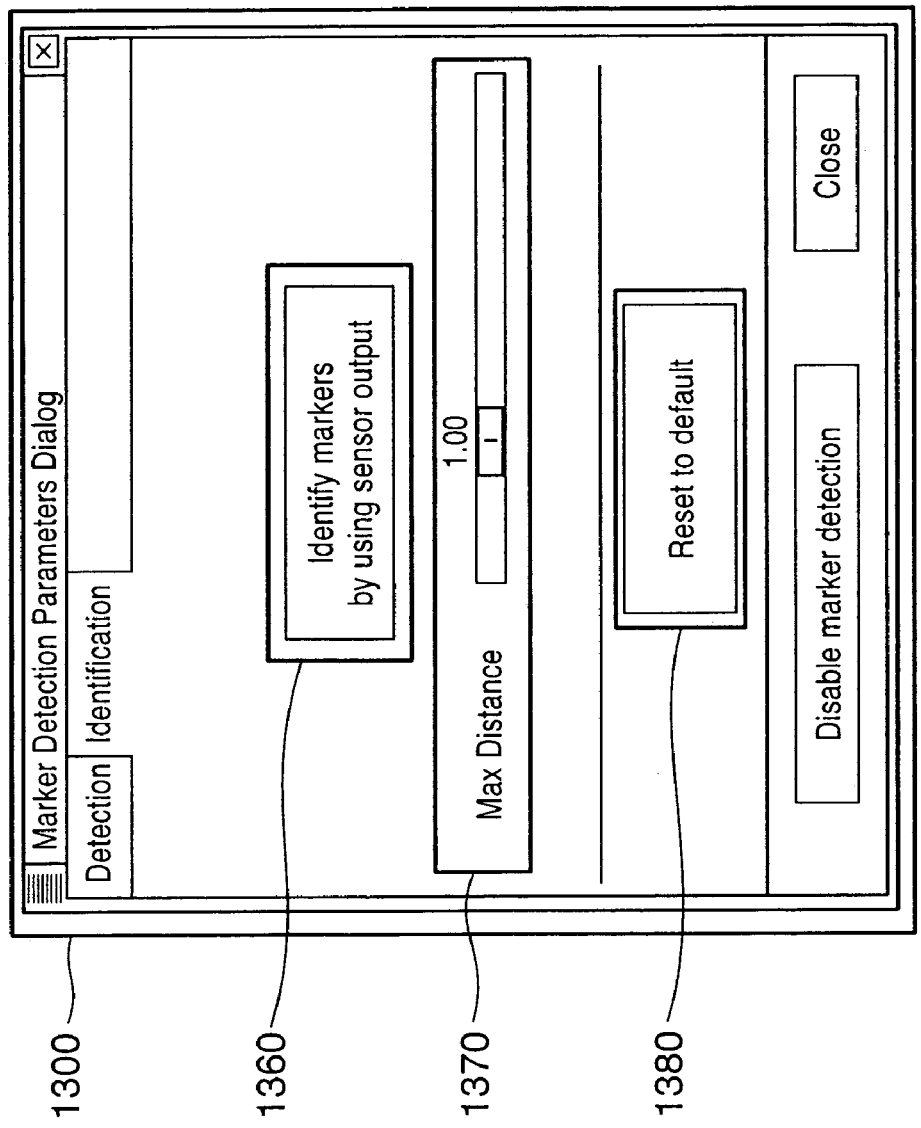
FIG. 12 is a view for explaining a detection parameter setup dialog of the GUI presented by the calibration apparatus according to the first embodiment.

FIGS. 11 and 12 show an example of a marker detection parameter setting dialog (marker detection parameters dialog) 1300. The marker detection parameter setting dialog 1300 includes parameter type select tubs 1310, a marker detection parameter setting area 1320, marker detection result display button 1330, marker detection parameter reset button 1340, marker detection disable button 1350, marker identification means switch button 1360, marker identification parameter setting area 1370, marker identification parameter reset button 1380, and marker detection parameter setting dialog close button 1390.

The parameter type select tubs 1310 are used to select and display one of a marker detection parameter setting dialog and marker identification parameter setting dialog, when the user of this apparatus selects one of tub regions using a pointing device such as a mouse or the like.

The marker detection parameter setting area 1320 is displayed when the marker detection parameter setting dialog is selected by the parameter type select tub 1310. On the marker detection parameter setting area 1320, the user of this apparatus sets threshold values of colors used to detect markers, and a minimum value of the number of pixels of a color region to be recognized as a marker using sliders, numerical value input boxes, and the like. The threshold values of colors are used to determine an arbitrary pixel as a marker candidate when color component values of that pixel exceed the threshold values.

In this embodiment, the threshold values are set for R, G, and B which indicate the luminance values of red, green, and blue. Alternatively, threshold values may be set for Y, Cr, and Cb components of a pixel. The minimum value of the number of pixels of a color region is used to inhibit a given color region from being recognized as marker, if the number of pixels of that color region is smaller than the set minimum value. In this embodiment, only the minimum value of the number of pixels of a color region is set. Also, a maximum value may be set at the same time, so as to limit the number of pixels which are recognized as marker candidates to fall within a given range.

The marker detection result display button 1330 gives an instruction to this apparatus when the user of this apparatus selects a button region using a pointing device such as a mouse or the like. Upon designation of the marker detection result display button 1330, one of a real image display mode and color extraction result image display mode is selected. In the real image display mode, a real image is displayed on the image display area 1010. In the color extraction result image display mode, a color extraction result image is displayed on the image display area 1010. In a color extraction result image shown in FIG. 13, only color regions extracted from the real image are displayed.

The marker detection parameter reset button 1340 is displayed when the marker detection parameter setting dialog is selected by the parameter type select tub 1310. The marker detection parameter reset button 1340 gives an instruction to this apparatus when the user of this apparatus selects a button region using a pointing device such as a mouse or the like. Upon designation of the marker detection parameter reset button 1340, the currently held marker detection parameters are discarded, and default values of marker detection parameters, which are set upon launching this apparatus, are set as current marker detection parameters.

The marker detection disable button 1350 is displayed when the marker detection parameter setting dialog is selected by the parameter type select tub 1310. The marker detection disable button 1350 gives an instruction to this apparatus when the user of this apparatus selects a button region using a pointing device such as a mouse or the like. Upon selection of the marker detection disable button 1350, a marker detection process is disabled.

The marker identification means switch button 1360 is displayed when the marker identification parameter setting dialog is selected by the parameter type select tub 1310. The marker identification means switch button 1360 gives an instruction to this apparatus when the user of this apparatus selects a button region using a pointing device such as a mouse or the like. Upon selection of the marker identification means switch button 1360, a marker identification function using the sensor measured value is selectively activated/deactivated. The marker identification function calculates the distance between the image coordinate position of the detected marker, and a coordinate position obtained by projecting the world coordinate position of the marker held by the world coordinate storing unit 110 onto the image sensing surface of the image sensing device 302, on the basis of the current sensor measured value and calibration information, and automatically identifies the marker when the minimum value of the distance is equal to or smaller than a maximum allowable value.

The marker identification parameter setting area 1370 is displayed when the marker identification parameter setting dialog is selected by the parameter type select tub 1310. On the marker identification parameter setting area 1370, the user of this apparatus sets a maximum allowable distance used to identify a marker using a slider, numerical value input box, and the like.

The marker identification parameter reset button 1380 is displayed when the marker identification parameter setting dialog is selected by the parameter type select tub 1310. The marker identification parameter reset button 1380 gives an instruction to this apparatus when the user of this apparatus selects a button region using a pointing device such as a mouse or the like. Upon designation of the marker identification parameter reset button 1380, the currently held marker identification parameters are discarded, and default values of marker identification parameters, which are set upon launching this apparatus, are set as current marker identification parameters.

The detection parameter setting dialog close button 1390 gives an instruction to this apparatus when the user of this apparatus selects a button region using a pointing device such as a mouse or the like. Upon selection of the detection parameter setting dialog close button 1390, the detection parameter setting dialog 1390 is closed. Even after the detection parameter setting dialog is closed, marker detection parameters and marker identification parameters are held.

FIG. 15 is a flow chart showing processes to be executed by the sensor calibration apparatus of this embodiment. Note that a program code that implements processes according to this flow chart is stored in a storage device such as the disk device 105, RAM 102, or the like in the apparatus of this embodiment, and is read out and executed by the CPU 101.

In step S000, the sensor calibration apparatus of this embodiment is launched.

The instruction unit 115 determines in step S100 whether or not the user of this apparatus has input a data acquisition command. If the data acquisition command has been input, the flow advances to step S110.

In step S110, the data management unit 111 receives the measured values of the current position and orientation of the receiver 301 from the sensor control unit 500.

In step S120, the data management unit 111 receives the identification information and image coordinate position of a marker which appears on a captured image sensed by the image sensing device 302 via the image coordinate acquisition unit 112. If a plurality of markers appear on the captured image, this step is repeated for these markers.

In step S130, the data management unit 111 receives the world coordinate position of a marker corresponding to the identification information obtained in step S120 from the world coordinate storing unit 110.

In step S140, the data management unit 111 adds input data to the data list for each detected marker.

The instruction unit 115 determines in step S200 whether or not the user of this apparatus has made an edit operation of the data list. If the edit operation of the data list has been made, the flow advances to step S210.

In step S210, the instruction unit 115 issues a command corresponding to the edit operation of the data list made by the user of this apparatus, thereby editing the data list. For example, the data list edit operation includes an operation for selecting an element of the data list, an operation for deleting the selected element from the data list, an operation for adding a new marker to the data list, an operation for deleting an existing marker from the data list, and an operation for giving identification information to the existing marker in the data list to identify that marker.

It is checked in step S300 if the data list acquired so far by the calibration information calculation unit 113 has information that suffices to calculate calibration information. If the data list does not meet a given condition, the flow returns to step S100 to wait for input of the next data acquisition command. On the other hand, if the data list meets a calibration information calculation condition, the flow advances to step S400. The calibration information calculation condition may include, for example, that data associated with three or more points of different markers be acquired, data be acquired at a plurality of viewpoint positions, and the total number of data be 6 or more. However, since the precision of calculated calibration information improves with increasing variety of input data, a condition that requires more data may be set.

It is determined in step S400 whether or not the user of this apparatus has input a calibration information calculation command. If the calibration information calculation command has been input, the flow advances to step S410; otherwise, the flow returns to step S100 to wait for input of the next data acquisition command.

In step S410, the calibration information calculation unit 113 executes a calibration information calculation process.

The instruction unit 115 determines in step S500 whether or not the user of this apparatus has made an edit operation of calibration information. If the edit operation of calibration information has been made, the flow advances to step S510.

In step S510, the instruction unit 115 issues a command corresponding to the calibration information edit operation made by the user of this apparatus, thus editing calibration information. For example, the calibration information edit operation includes an operation for changing parameters of calibration information, an operation for loading calibration information, and an operation for resetting calibration information.

The instruction unit 115 determines in step S600 whether or not the user of this apparatus has made a save operation of calibration information. If the save operation of calibration information has been made, the flow advances to step S610.

In step S610, the instruction unit 115 outputs a file save request to the calibration information storing unit 114 to output the currently held calibration information to the disk device 105.

The instruction unit 115 determines in step S700 whether or not the user of this apparatus has made a quit operation of this apparatus. If the quit operation of this apparatus has been made, the flow advances to step S800; otherwise, the flow returns to step S100.

In step S800, a process for quitting this apparatus is executed.

Figure 16:
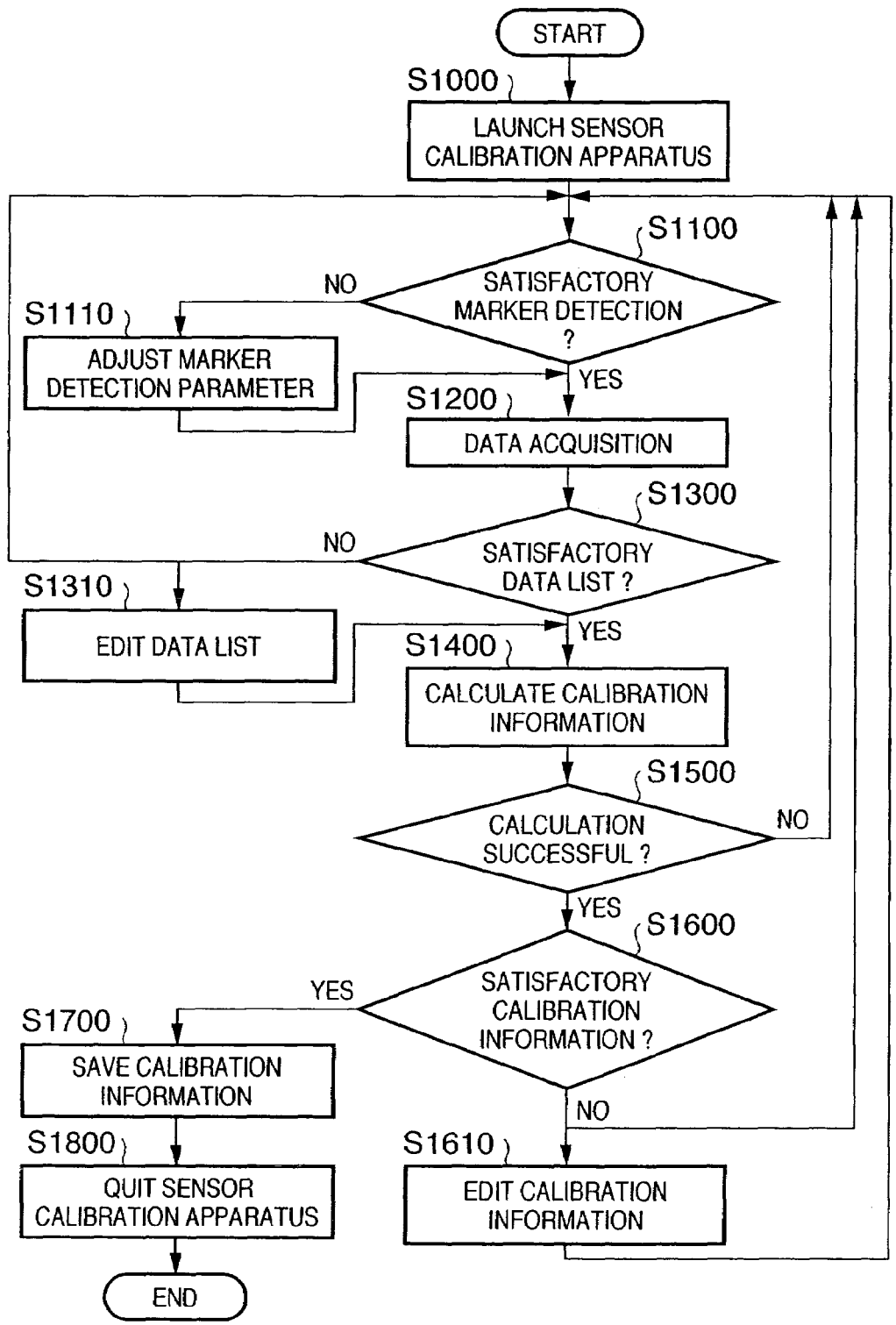
FIG. 16 is a flow chart showing the sequence when the user of the sensor calibration apparatus uses the sensor calibration apparatus in the first embodiment.

FIG. 16 is a flow chart of standard operations made when the user of the sensor calibration apparatus of this embodiment calibrates the sensor using this apparatus.

In step S1000, the user of this apparatus launches the sensor calibration apparatus of this embodiment.

In step S1100, the user of this apparatus senses an image of a given marker using the image sensing device 302. The user of this apparatus confirms whether or not the image coordinate acquisition unit 112 of this apparatus correctly specifies the image coordinate position and identification information of the marker. If the image coordinate position and identification information can be correctly specified, the flow advances to step S1200; otherwise, the flow advances to step S1110.

In step S1110, the user of this apparatus gives instructions for adjusting marker detection parameters and marker identification parameters to the instruction unit 115 using, e.g., the marker detection parameter setting dialog 1300.

In step S1200, the user of this apparatus makes the instruction unit 115 issue a data acquisition command using, e.g., the data acquisition button 1120.

The user of this apparatus confirms in step S1300 whether or not respective data of the acquired data list are satisfactory. If the data are satisfactory, the flow advances to step S1400; otherwise, the flow advances to step S1310 or returns to step S1100 depending on circumstances.

In step S1310, the user of this apparatus gives an instruction for a data list edit operation to the instruction unit 115 using, e.g., the data acquisition dialog 1100.

In step S1400, the user of this apparatus makes the instruction unit 115 issue a calibration information calculation command using, e.g., the calibration information calculation button 1140.

The user of this apparatus confirms in step S1500 whether or not the calibration information calculation unit 113 correctly calculates calibration information. If the calibration information is calculated correctly, the flow advances to step S1600; otherwise, the flow returns to step S1100.

The user of this apparatus confirms in step S1600 whether or not the calibration information calculated by the calibration information calculation unit 113 is satisfactory. If the calibration information is satisfactory, the flow advances to step S1700; otherwise, the flow advances to step S1610 or returns to step S1100 depending on circumstances.

In step S1610, the user of this apparatus gives an instruction for editing calibration information to the instruction unit 115 using, e.g., the initial value setting dialog 1200.

In step S1700, the user of this apparatus makes the instruction unit 115 issue a file save command using, e.g., the save sub-menu 1050.

In step S1800, the user of this embodiment makes this apparatus quit using, e.g., the quit sub-menu 1060.

Second Embodiment

Figure 17:
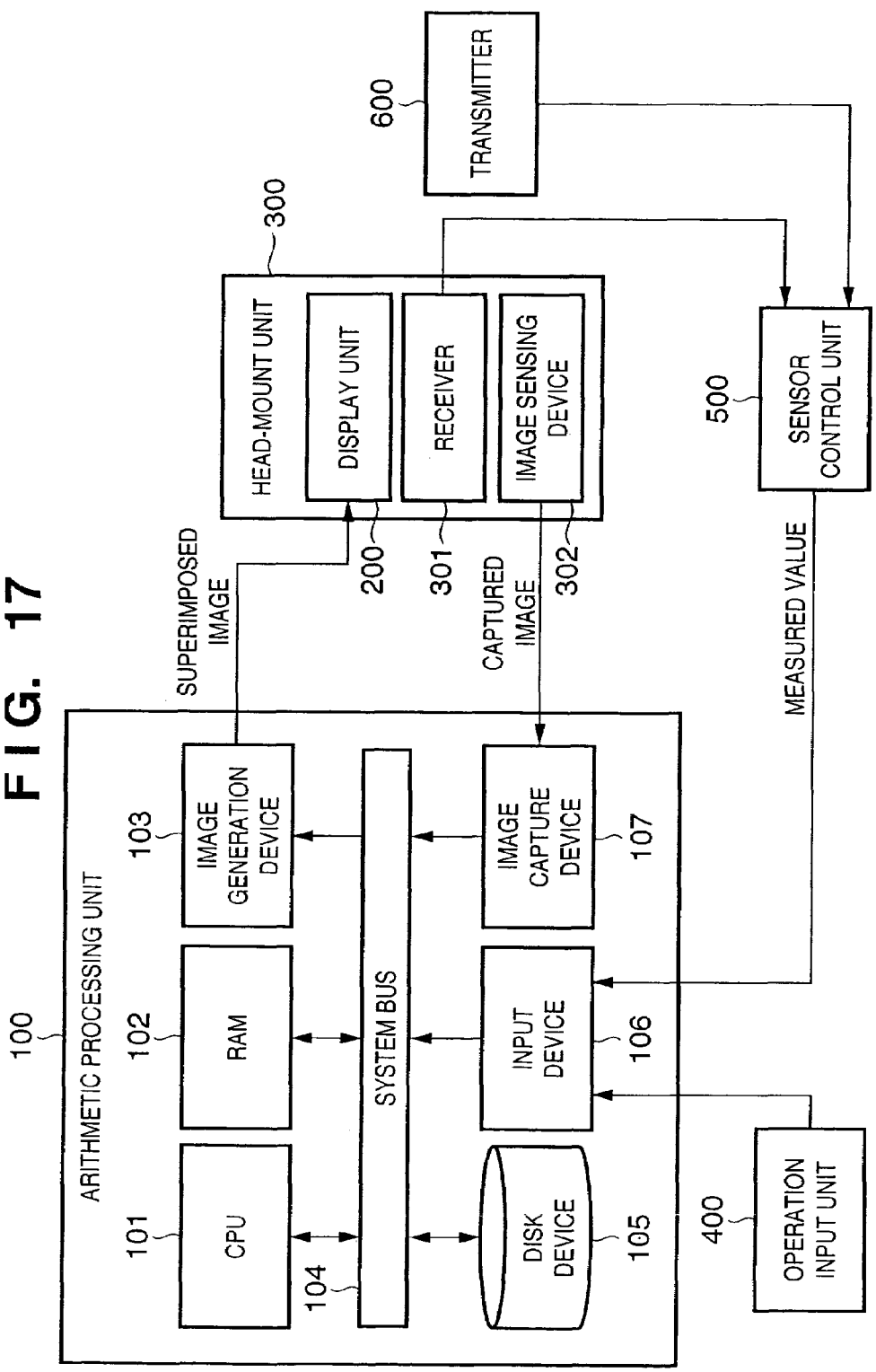
FIG. 17 is a schematic block diagram for explaining the arrangement of a sensor calibration apparatus according to the second embodiment.

FIG. 17 is a schematic block diagram showing the arrangement of a sensor calibration apparatus according to the second embodiment of the present invention. In the first embodiment, the display unit 200 is arranged outside the head-mount unit 300. In the second embodiment, the display unit 200 is included in the head-mount unit 300. Such arrangement can be implemented when a display device such as an HMD or the like that the user can wear on the head is used as the display unit 200. In the second embodiment, since the head-wearable display device is used, the user of this apparatus can calibrate under the same condition as that upon using an image display apparatus which presents mixed reality.

Third Embodiment

Figure 18:
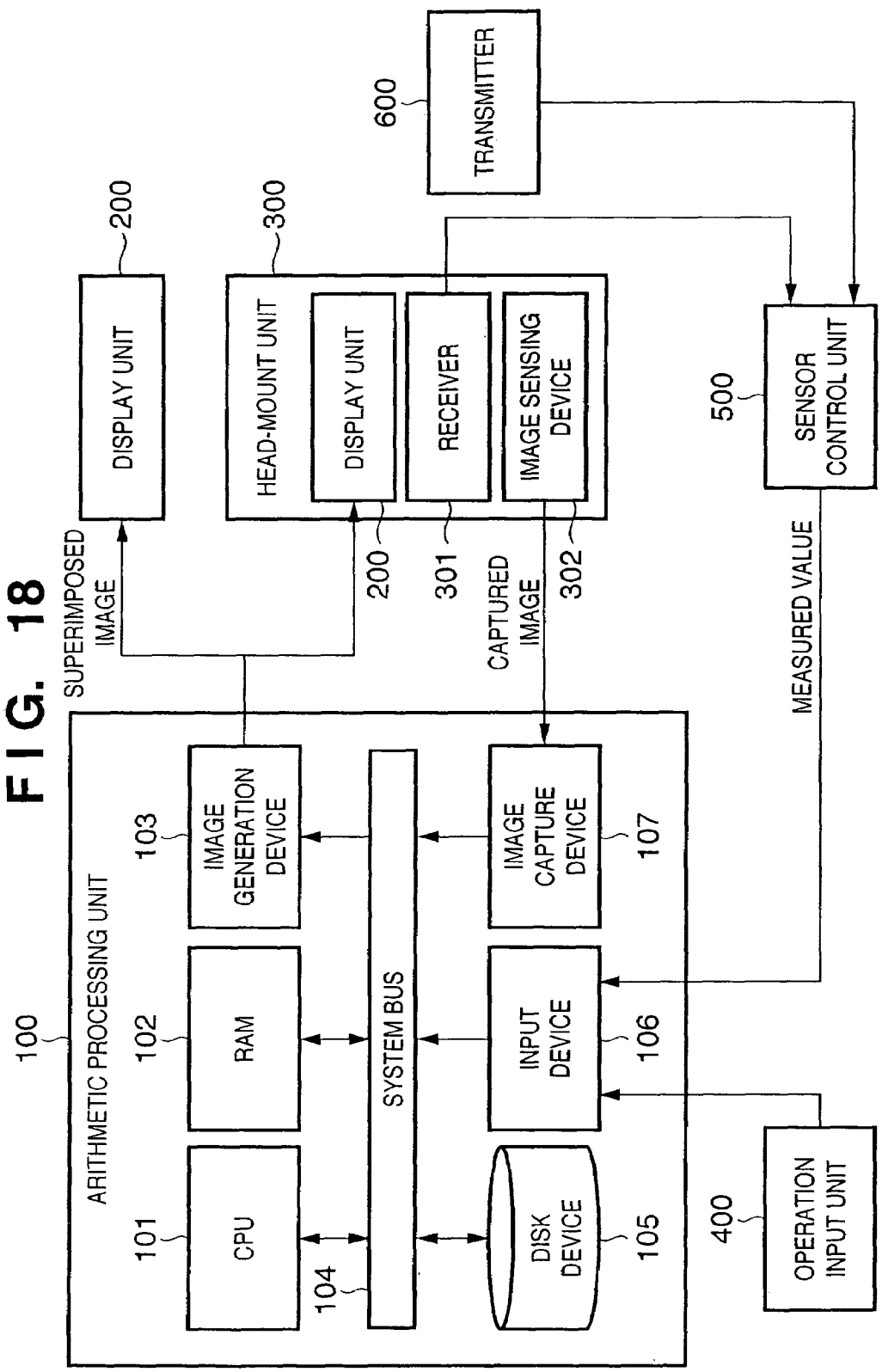
FIG. 18 is a schematic block diagram for explaining the arrangement of a sensor calibration apparatus according to the third embodiment.

FIG. 18 is a schematic block diagram showing the arrangement of a sensor calibration apparatus according to the third embodiment of the present invention. In the third embodiment, the display unit 200 comprises both a display device which is arranged outside the head-mount unit 300 in the first embodiment, and a display device that the user of this apparatus wears on the head in the second embodiment. For example, an HMD normally has lower resolution than a normal display device such as a CRT monitor, liquid crystal monitor, or the like. When such display device is used, the user of this apparatus can hardly give instructions to this apparatus using the GUI that has been explained in the first embodiment. In such case, for example, this apparatus may be used by two users.

That is, the display device which is observed by the first user of this apparatus and is arranged outside the head-mount unit 300 (the display unit in the first embodiment) displays the GUI that has been explained in the first embodiment. The display device that the second user of this apparatus wears on the head (the display unit in the second embodiment) displays a real image, a composite image formed by superimposing various kinds of information and CG on the real image, marker color extraction images, and the like except for the GUI that has been explained in the first embodiment. Since the first user operates this apparatus, and the second user adjusts the positions and orientations of the image sensing device 302 and receiver 301, a calibration work can be efficiently done.

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores the program codes corresponding to the aforementioned flow chart (shown in FIG. 15).

As described above, according to the present invention, upon adjusting the position and orientation of an image sensing unit to capture an image of a transmitter of a sensor in a real space is acquired, the measured value of the sensor is acquired, a virtual image of the transmitter is superimposed on the captured image on the basis of parameters calculated using the sensor measured value, the captured image superimposed with the virtual image of the transmitter is displayed, a user's instruction associated with adjustment values of the parameters is input, and the virtual image is updated in accordance with the adjustment values. Hence, the parameters can be easily adjusted.

Also, since the transmitter of the sensor is used, the user need not perform any special preparation.

As many apparently widely different embodiments of the present invention can be made without departing from the spirit and scope thereof, it is to be understood that the invention is not limited to the specific embodiments thereof except as defined in the appended claims.

What is claimed is:

1. An information processing method for optimizing a third parameter used to transform a measured value of a sensor into a position and orientation of an image sensing unit on a world coordinate system, wherein the sensor comprises a transmitter and a receiver, said method comprising the steps of:

acquiring the measured value of the sensor when an image of the transmitter of the sensor is captured by the image sensing unit to which the receiver of the sensor is attached, wherein the transmitter of the sensor is an origin of a sensor coordinate system;

calculating a first parameter used to transform a measured value of a sensor into a position and orientation of an image sensing unit, by using the measured value of the sensor;

superimposing a virtual image of the transmitter on a captured image on the basis of the calculated first parameter;

inputting a user's instruction associated with an adjustment value of the calculated first parameter, and updating the virtual image in accordance with the adjustment value;

setting a second parameter used to calculate a position and orientation of the transmitter on a world coordinate system in accordance with a user's manual instruction;

acquiring another captured image, obtained by capturing an image of the real space, where a plurality of markers whose known world coordinate positions are laid out, using the image sensing unit and the measured value of the sensor upon capturing the image;

detecting positions of the plurality of markers included in the other captured image; and optimizing the third parameter using the measured value of the sensor, the positions of the detected markers, the world coordinate positions of the detected markers, and the first and the second parameters.

2. A program, stored in a computer readable storage medium, for implementing an information processing method for optimizing a third parameter used to transform a measured value of a sensor into a position and orientation of an image sensing unit on a world coordinate system, wherein the sensor comprises a transmitter and a receiver, the program comprising code for:

acquiring the measured value of the sensor when an image of the transmitter of the sensor is captured by the image sensing unit on which the receiver of the sensor is attached, wherein the transmitter of the sensor is an origin of a sensor coordinate system;

calculating a first parameter used to transform a measured value of a sensor into a position and orientation of an image sensing unit, by using the measured value of the sensor;

superimposing a virtual image of the transmitter on a captured image on the basis of the calculated first parameter;

inputting a user's instruction associated with an adjustment value of the calculated first parameter, and updating the virtual image in accordance with the adjustment value;

setting a second parameter used to calculate a position and orientation of the transmitter on a world coordinate system in accordance with a user's manual instruction;

acquiring another captured image, obtained by capturing an image of the real space, where a plurality of markers whose known world coordinate positions are laid out, using the image sensing unit and the measured value of the sensor upon capturing the image;

detecting positions of the plurality of markers included in the other captured image; and optimizing the third parameter using the measured value of the sensor, the positions of the detected markers, the world coordinate positions of the detected markers, and the first and the second parameters.

3. An information processing apparatus for optimizing a third parameter used to transform a measured value of a sensor into a position and orientation of an image sensing unit on a world coordinate system, wherein the sensor comprises a transmitter and a receiver, comprising:

an acquiring unit for acquiring the measured value of the sensor when an image of the transmitter of the sensor is captured by the image sensing unit on which the receiver of the sensor is attached, wherein the transmitter of the sensor is an origin of a sensor coordinate system;

a calculating unit for calculating a first parameter used to transform a measured value of a sensor into a position and orientation of an image sensing unit, by using the measured value of the sensor;

a superimposing unit for superimposing a virtual image of the transmitter on a captured image on the basis of the calculated first parameter;

an inputting unit for inputting a user's instruction associated with an adjustment value of the calculated first parameter, and updating the virtual image in accordance with the adjustment value;

a setting unit for setting a second parameter used to calculate a position and orientation of the transmitter on a world coordinate system in accordance with a user's manual instruction;

an acquiring unit for acquiring another captured image, obtained by capturing an image of the real space, where a plurality of markers whose known world coordinate positions are laid out, using the image sensing unit and the measured value of the sensor upon capturing the image;

a detecting unit for detecting positions of the plurality of markers included in the other captured image; and an optimizing unit for optimizing the third parameter using the measured value of the sensor, the positions of the detected markers, the world coordinate positions of the detected markers, and the first and the second parameters.

* * * * *

UNITED STATES PATENT AND TRADEMARK OFFICE
CERTIFICATE OF CORRECTION

PATENT NO. : 7,035,760 B2  Page 1 of 1
APPLICATION NO. : 10/670285
DATED : April 25, 2006
INVENTOR(S) : Toshihiro Kobayashi et al.

It is certified that error appears in the above-identified patent and that said Letters Patent is hereby corrected as shown below:

Title Page, item [57] ABSTRACT

Line 7, "device by attaching" should read --device obtained by attaching--.
　　　Line 13, "steps. Adjusting" should read --steps: adjusting--.
　　　Line 14, "so as to the transmitter" should read --so as to capture the transmitter--.
　　　Line 16, "sensor" should read --sensor,--.
　　　Line 18, "unit" should read --unit.--.

COLUMN 1

Line 15, "joint" should read --juncture--.

COLUMN 3

Line 11, "further" should read --a further--.
　　　Line 18, "calculated" should read --calculate--.

COLUMN 12

Line 12, "device-" should read --device--.
　　　Line 59, "regions" should read --regions,--.

COLUMN 20

Line 62, "is acquired," should read --and the image is captured,--.

Signed and Sealed this

Twenty-first Day of November, 2006

JON W. DUDAS
*Director of the United States Patent and Trademark Office*